US012563288B2

(12) United States Patent
Chen et al.

(10) Patent No.: US 12,563,288 B2
(45) Date of Patent: Feb. 24, 2026

(54) IMAGE CAPTURE METHOD, AND RELATED APPARATUS AND SYSTEM

(71) Applicant: HUAWEI TECHNOLOGIES CO., LTD., Guangdong (CN)

(72) Inventors: Shaojun Chen, Shanghai (CN); Zhishan Zhuang, Shenzhen (CN); Zhangliang Xiong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 18/556,338

(22) PCT Filed: Apr. 8, 2022

(86) PCT No.: PCT/CN2022/085892
§ 371 (c)(1),
(2) Date: Oct. 19, 2023

(87) PCT Pub. No.: WO2022/222773
PCT Pub. Date: Oct. 27, 2022

(65) Prior Publication Data
US 2024/0365002 A1     Oct. 31, 2024

(30) Foreign Application Priority Data
Apr. 19, 2021     (CN) ......................... 202110421065.3

(51) Int. Cl.
H04N 23/661     (2023.01)
G06F 3/0482     (2013.01)
(Continued)

(52) U.S. Cl.
CPC ......... H04N 23/662 (2023.01); G06F 3/0482 (2013.01); G06F 3/04847 (2013.01);
(Continued)

(58) Field of Classification Search
CPC .. H04N 23/662; H04N 23/632; H04N 23/633; G06F 3/0482; G06F 3/04847;
(Continued)

(56) References Cited

U.S. PATENT DOCUMENTS 10,904,446 B1     1/2021   Ostap et al.
2016/0360116 A1*  12/2016  Penha .................. G06F 3/0487
(Continued)

FOREIGN PATENT DOCUMENTS

CN     105898228 A     8/2016
CN     107809588 A     3/2018
(Continued)

*Primary Examiner* — Mekonnen D Dagnew

(57)     ABSTRACT
This application discloses an image capture method. The image capture method relates to a master device and a slave device. In the method, the master device may establish a communication connection with the slave device. After the connection is established, the master device may obtain an image captured by a camera of the slave device, and display the image on a user interface of the master device. In addition, the master device may further receive a control operation of a user for the image captured by the slave device, and in response to the control operation, the master device changes display effect of the image. In this way, the master device can provide a user with multi-angle image capture experience, and facilitate an image capture requirement of the user, thereby meeting diversified image capture requirements of the user.

19 Claims, 32 Drawing Sheets

Communication system 10

Server 300

Master device 100                    Slave device 200

(51) Int. Cl.
  *G06F 3/04847* (2022.01)
  *H04M 1/72439* (2021.01)
  *H04N 23/63* (2023.01)
(52) U.S. Cl.
  CPC ...... *H04M 1/72439* (2021.01); *H04N 23/632*
    (2023.01); *G06F 2203/04806* (2013.01)
(58) Field of Classification Search
  CPC . G06F 2203/04806; G06F 2203/04808; G06F
    3/0485; G06F 3/04883; H04M 1/72439;
    H04M 2250/52
  See application file for complete search history.

(56) References Cited

U.S. PATENT DOCUMENTS

| | | | | |
|---|---|---|---|---|
| 2017/0339299 | A1* | 11/2017 | Iki | H04N 23/667 |
| 2020/0019213 | A1* | 1/2020 | Lee | H04N 7/188 |
| 2020/0236274 | A1 | 7/2020 | Cowell | |

FOREIGN PATENT DOCUMENTS

| | | |
|---|---|---|
| CN | 109391606 A | 2/2019 |
| CN | 109600549 A | 4/2019 |
| CN | 109660710 A | 4/2019 |
| CN | 110386064 A | 10/2019 |
| CN | 110996047 A | 4/2020 |
| CN | 111327758 A | 6/2020 |
| CN | 111385463 A | 7/2020 |

* cited by examiner

Communication system 10

Server 300

Master device 100                        Slave device 200

Master device 100

Figure 5D:
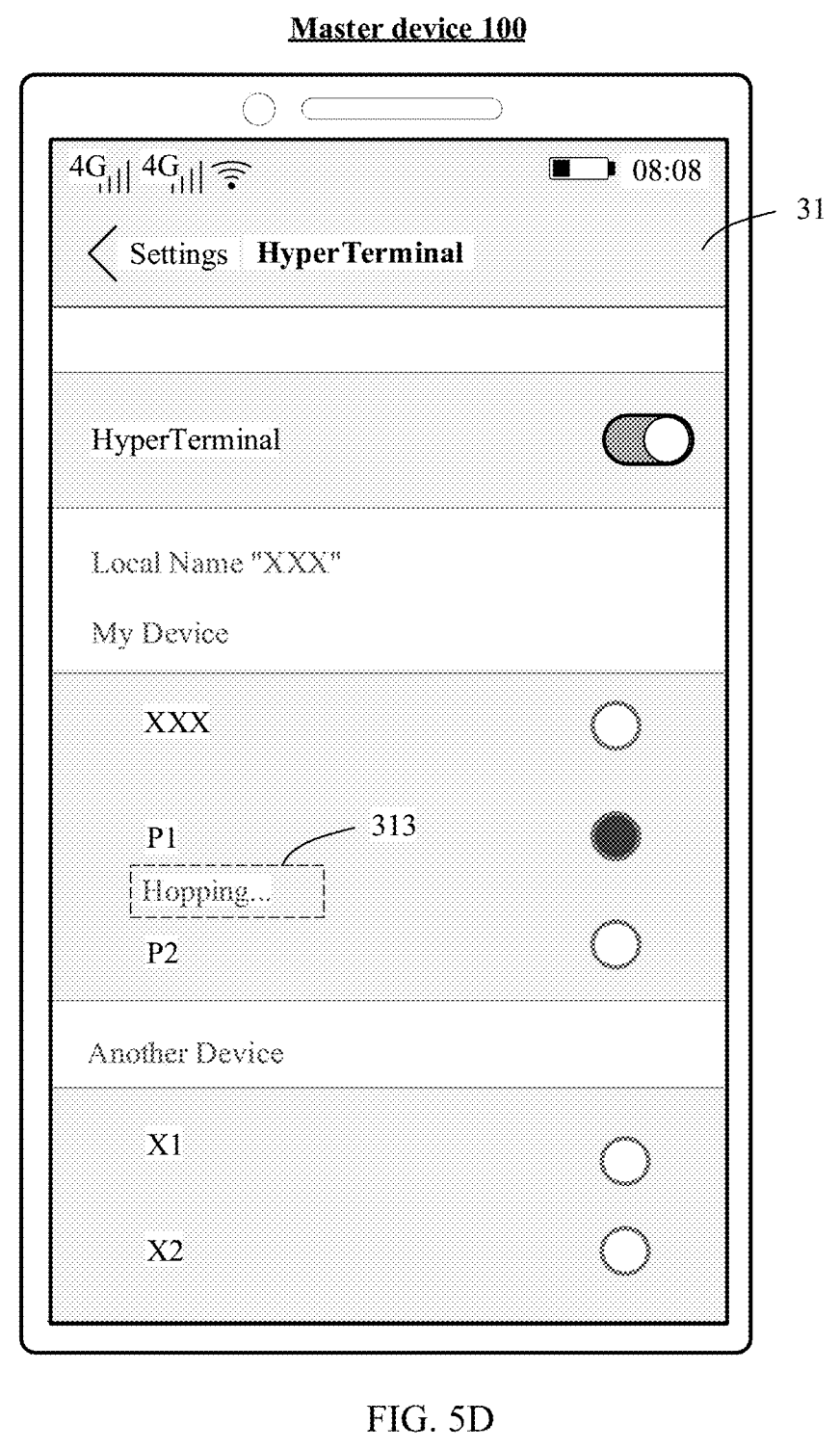

Master device 100

4G | 4G | 🛜                    🔋 08:08

⟨ Settings   HyperTerminal                    — 31

HyperTerminal                    ⬤

Local Name "XXX"

My Device

XXX                              ◯

P1                    — 313
⌐ Hopping... ¬
P2                              ◯

Another Device

Master device 100

Master device 100

Master device 100

Master device 100

Master device 100

Master device 100

Master device 100

Slave device 200

Master device 100

Master device 100

Slave device 200

Slave device 200

IMAGE CAPTURE METHOD, AND RELATED APPARATUS AND SYSTEM

CROSS-REFERENCE TO RELATED APPLICATIONS

This application is a national stage of International Application No. PCT/CN2022/085892 filed on Apr. 8, 2022, which claims priority to Chinese Patent Application No. 202110421065.3, filed on Apr. 19, 2021. Both of the aforementioned applications are hereby incorporated by reference in their entireties.

TECHNICAL FIELD

This application relates to the field of terminals and communication technologies, and in particular, to an image capture method, and a related apparatus and system.

BACKGROUND

With the development of smart mobile devices, an image capture function of a smart mobile device gradually attracts users.

As a capture angle for capture by a single camera is limited, a current smart mobile device may obtain and display, by using an application bound to another device, an image captured by the another device, to obtain more diversified image capture angles. However, the foregoing solution of multi-device cooperation cannot meet a requirement of a user. For example, when a calling user is being in a video call, the calling user cannot share, with a called user in real time, an image captured by another device connected to a terminal used by the calling user.

SUMMARY

This application provides an image capture method, and a related apparatus and system. The image capture method relates to a master device and a slave device. In the method, the master device may establish a communication connection with the slave device, and may obtain and display an image captured by the slave device after the connection is established, thereby meeting multi-angle image capture requirements of a user.

According to a first aspect, an embodiment of this application provides an image capture method. The method is applied to a first device. The method includes: displaying, by the first device, an interface of an application, and receiving, by the first device, a first operation performed on the interface; receiving, by the first device after the first device receives the first operation on the interface, a second image sent by a second device; and displaying, by the first device, a third image on the interface in response to the first operation. The third image is obtained by the first device by processing the second image based on a second image capture parameter indicated by the first operation, or the third image is the second image and the second image is obtained by the second device based on a second image capture parameter indicated by the first operation. The second image capture parameter is within an image capture capability range of the first device.

In this embodiment of this application, the first device is a master device, and the second device is a slave device. The master device may receive a user operation of adjusting display effect by a user. In response to the operation, the master device obtains an image with the display effect adjusted. The image is an image sent by the slave device. In other words, the master device may adjust the display effect of the image of the slave device. The display effect may be adjusted by the master device, the slave device, or the master and slave devices together. In this way, the master device can not only provide multi-angle image capture experience for the user, but also facilitate an image capture requirement of the user.

With reference to the first aspect, in an implementation, before the receiving, by the first device, a first operation performed on the interface, the method further includes: receiving, by the first device, a first image sent by the second device, where the first image is obtained by the second device based on a preset first image capture parameter; and displaying, by the first device, the first image on the interface. The displaying, by the first device, a third image on the interface in response to the first operation specifically includes: displaying, by the first device, the third image on the interface in response to the first operation, and stopping displaying the first image.

To be specific, before the master device receives the user operation of adjusting the display effect by the user, the master device may further display an image sent by the slave device. The image is an image obtained by the slave device based on a preset image capture parameter. In this way, the master device can display images before and after adjustment, and the user can also adjust the image displayed on the master device into desired picture effect, to enhance picture visibility.

With reference to the first aspect, in an implementation, before the receiving, by the first device, a first image sent by the second device, the method further includes: sending, by the first device, a first request to the second device. The first request is for triggering the second device to obtain the first image.

With reference to the first aspect, in an implementation, the third image is obtained by the first device by processing the second image based on the second image capture parameter indicated by the first operation, and the second image is obtained by the second device based on the first image capture parameter.

The third image may be an image obtained after the master device adjusts an image captured by the slave device. In other words, when the master device receives the operation of adjusting the display effect by the user, the display effect may be adjusted by the master device. In this way, the master device can adjust, with an image capture capability of the master device, the image captured by the slave device, to obtain display effect that cannot be obtained through adjustment by the slave device.

When the third image is the second image, the third image may be an image obtained through adjustment by the slave device based on an image capture parameter. In other words, when the master device receives the operation of adjusting the display effect by the user, the display effect may be adjusted by the slave device. In this way, the master device can control the slave device to adjust the display effect of the image, and the slave device can adjust the display effect of the image based on an image capture capability of the slave device.

With reference to the first aspect, in an implementation, the third image is obtained by the first device by processing the second image based on the second image capture parameter indicated by the first operation. Before the receiving, by the first device, a second image sent by a second device, the method further includes: sending, by the first device, the second image capture parameter to the second device. The second image is obtained by the second device based on the second image capture parameter.

The display effect may alternatively be adjusted by the master device and the slave device together. Specifically, when the master device receives the operation of adjusting the display effect by the user, the slave device first adjusts the display effect of the image based on an image capture parameter indicated by the operation, and then sends an adjusted image to the master device, and the master device adjusts the adjusted image based on the image capture parameter. In this way, the master and slave devices can collaboratively adjust the display effect to be as close as possible to display effect required by the user, which avoids a case in which the master device or the slave device cannot adjust the display effect alone.

In addition, the display effect may alternatively be adjusted in two ways. One way is that the display effect may be adjusted by the master device, and the other way is that the display effect may be adjusted by the slave device. When receiving the operation of adjusting the display effect by the user, the master device may determine whether the display effect is adjusted by the master device or the slave device.

With reference to the first aspect, in an implementation, the second image is obtained by the second device based on the second image capture parameter. If the second image capture parameter is outside an image capture capability range of the second device, the second image is specifically obtained by the second device based on a third image capture parameter. The third image capture parameter is a parameter that is within the image capture capability range of the second device and that is closest to the second image capture parameter, or the third image capture parameter is a preset image capture parameter.

In other words, when the display effect is adjusted by the slave device, or when the display effect is adjusted by the slave device first and then further adjusted by the master device based on the adjustment by the slave device, after the master device sends an instruction for adjusting the display effect to the slave device, the slave device may further perform compatibility processing on the instruction, so that the slave device can effectively complete adjustment of corresponding display effect in response to the processed instruction. In this way, when the slave device participates in adjustment of the display effect, the slave device may complete the adjustment of the display effect as much as possible, to meet an image capture requirement of the user as much as possible, thereby improving user experience.

With reference to the first aspect, in an implementation, the interface further displays a plurality of image capture options, and image capture parameters corresponding to the plurality of image capture options are within the image capture capability range of the first device. The first operation includes an operation performed on an image capture option. The second image capture parameter includes an image capture parameter corresponding to the image capture option on which the first operation is performed.

The plurality of image capture options may respectively represent adjustment controls existing on the master device, such as a zoom control, a photographing mode control, a flash control, and a filter adding control. These controls correspond to an image capture capability of the master device. The user may deliver, to the master device based on these image capture options, an instruction within an image capture capability range of the master device. The instruction includes an image capture parameter for adjusting display effect.

With reference to the first aspect, in an implementation, before the receiving, by the first device, a first image sent by the second device, the method further includes: displaying, by the first device, a fourth image on the interface, where the fourth image is obtained by the first device. The displaying, by the first device, the first image on the interface specifically includes: displaying, by the first device, the first image on the interface, and stopping displaying the fourth image.

To be specific, before the master device displays an image sent by the slave device, the master device may further display an image captured by a camera of the master device. The user may choose, based on a requirement of the user, to display the image obtained by the master device or the image obtained by the slave device, to meet more image capture requirements of the user.

With reference to the first aspect, in an implementation, the application includes one or more of the following: a video call application, a photographing application, a live streaming application, an image recognition application, and an image translation application.

With reference to the first aspect, in an implementation, the application is a video call application. After the displaying, by the first device, the third image on the interface in response to the first operation, and stopping displaying the first image, the method further includes: sending, by the first device, the third image to a server corresponding to the video call application, for the server to send the third image to a third device.

To be specific, after obtaining an image sent by the slave device, the master device may not only display, on an interface of the master device, the image sent by the slave device, but also send, by using a third-party application, the image of the slave device to another electronic device associated with the third-party application. In this way, the master device can obtain the image of the slave device without adaptation of the third-party application, thereby extending a camera usage scenario of the master and slave devices.

With reference to the first aspect, in an implementation, the first device obtains, through a first channel, the second image sent by the second device, and displays the third image through the first channel; and before the displaying, by the first device, a fourth image on the interface, the method further includes: processing, by the first device through the first channel, an image captured by the first device, and obtaining the fourth image.

The master device transmits an image of the slave device by using a channel of the master device for transmitting a data stream, without an additional channel. A camera of the slave device is equivalent to a remote camera of the master device, extending a camera function of the master device.

According to a second aspect, an embodiment of this application provides an image capture method. The method is applied to a first device. The method includes: receiving, by the first device, a second operation; receiving, in response to the second operation when a communication connection is established between the first device and a second device, a first image sent by the second device; and displaying, by the first device, the first image on an interface of an application, and skipping displaying a fourth image. Before the communication connection is established between the first device and the second device, the second operation is for the first device to display the fourth image, and the fourth image is obtained by the first device.

In this embodiment of this application, the first device may be a master device, and the second device may be a slave device. Before a communication connection is established between the master device and the slave device, the master device may display, in response to an operation of a user, an image captured by a camera of the master device. After the communication connection is established between the master device and the slave device, the master device may display, in response to an operation of the user, an image captured by a camera of the slave device. In the method, the camera of the slave device is equivalent to a remote camera of the master device, and the master device can obtain the image of the slave device without adaptation of a third-party application, thereby extending a camera usage scenario of the master and slave devices.

With reference to the second aspect, in an implementation, after the receiving, by the first device, a second operation, the method further includes: displaying, by the first device, the fourth image on the interface. Before the receiving, by the first device, a first image sent by the second device, the method further includes: receiving, by the first device, a third operation. The third operation is for triggering the first device to obtain the first image.

In this way, a communication connection may be established between the master device and the slave device in advance, and an image displayed by the master device is not affected by the communication connection. When the master device is in a photographing scenario, the master device still displays, by default, the image captured by a camera of the master device. After the master device receives an operation of switching a camera by the user, the master device switches from displaying the image captured by the camera of the master device to displaying an image obtained by the slave device.

With reference to the second aspect, in an implementation, after the displaying, by the first device, the first image on an interface of an application, the method further includes: receiving, by the first device, a first operation performed on the interface; receiving, by the first device after the first device receives the first operation on the interface, a second image sent by a second device; and displaying, by the first device, a third image on the interface in response to the first operation. The third image is obtained by the first device by processing the second image based on a second image capture parameter indicated by the first operation, or the third image is the second image and the second image is obtained by the second device based on a second image capture parameter indicated by the first operation. The second image capture parameter is within an image capture capability range of the first device.

After a communication connection is established between the master device and the slave device, the master device may change display effect of an image of the slave device. The display effect may be adjusted by the master device, the slave device, or the master and slave devices together. In this way, the master device can provide a user with multi-angle image capture experience, and facilitate an image capture requirement of the user, thereby meeting diversified image capture requirements of the user.

With reference to the second aspect, in an implementation, the second image is obtained by the second device based on the second image capture parameter. If the second image capture parameter is outside an image capture capability range of the second device, the second image is specifically obtained by the second device based on a third image capture parameter. The third image capture parameter is a parameter that is within the image capture capability range of the second device and that is closest to the second image capture parameter, or the third image capture parameter is a preset image capture parameter.

With reference to the second aspect, in an implementation, before the receiving, by the first device, a first operation performed on the interface, the method further includes: receiving, by the first device, the first image sent by the second device, where the first image is obtained by the second device based on a preset first image capture parameter; and displaying, by the first device, the first image on the interface. The displaying, by the first device, a third image on the interface in response to the first operation specifically includes: displaying, by the first device, the third image on the interface in response to the first operation, and stopping displaying the first image.

With reference to the second aspect, in an implementation, after the receiving, by the first device, a second operation, the method further includes: sending, by the first device, a first request to the second device. The first request is for triggering the second device to obtain the first image.

With reference to the second aspect, in an implementation, the third image is obtained by the first device by processing the second image based on the second image capture parameter indicated by the first operation, and the second image is obtained by the second device based on the first image capture parameter.

With reference to the second aspect, in an implementation, the third image is obtained by the first device by processing the second image based on the second image capture parameter indicated by the first operation. Before the receiving, by the first device, a second image sent by a second device, the method further includes: sending, by the first device, the second image capture parameter to the second device. The second image is obtained by the second device based on the second image capture parameter.

With reference to the second aspect, in an implementation, the first device obtains, through a first channel, the second image sent by the second device, and displays the third image through the first channel. Before the displaying, by the first device, a fourth image on the interface, the method further includes: processing, by the first device through the first channel, an image captured by the first device, and obtaining the fourth image.

With reference to the second aspect, in an implementation, the interface further displays a plurality of image capture options, and image capture parameters corresponding to the plurality of image capture options are within an image capture capability range of the first device. The first operation includes an operation performed on an image capture option. The second image capture parameter includes an image capture parameter corresponding to the image capture option on which the first operation is performed.

With reference to the second aspect, in an implementation, the application includes one or more of the following: a video call application, a photographing application, a live streaming application, an image recognition application, and an image translation application.

With reference to the second aspect, in an implementation, the application is a video call application. After the displaying, by the first device, the third image on the interface in response to the first operation, and stopping displaying the first image, the method further includes: sending, by the first device, the third image to a server corresponding to the video call application, for the server to send the third image to a third device.

According to a third aspect, an embodiment of this application provides an image capture method. The method is applied to a second device. The method includes: obtaining, by the second device, a first image based on a preset first image capture parameter; sending, by the second device, the first image to a first device; receiving, by the second device, a first instruction that carries a second image capture parameter and that is sent by the first device; and sending, by the second device, a second image to the first device. The second image is specifically an image obtained by the second device based on the first image capture parameter or an image obtained by the second device based on the second image capture parameter. The second image is for the first device to obtain a third image. The third image is displayed on an interface of the first device. The third image is the second image, or the third image is obtained by the first device by processing the second image based on the second image capture parameter.

In other words, a slave device may adjust, according to an instruction for adjusting display effect that is sent by a master device, display effect of an image captured by the slave device.

With reference to the third aspect, in an implementation, the second image is specifically an image obtained by the second device based on the second image capture parameter. If the second image capture parameter is outside an image capture capability range of the second device, the second image is specifically obtained by the second device based on a third image capture parameter. The third image capture parameter is a parameter that is within the image capture capability range of the second device and that is closest to the second image capture parameter, or the third image capture parameter is a preset image capture parameter.

In other words, the slave device may perform compatibility processing on an instruction, and then the slave device obtains an image according to the processed instruction. In this case, the slave device can effectively complete adjustment of corresponding display effect in response to the processed instruction. The compatibility processing may include but is not limited to: modifying an instruction format, modifying an instruction parameter, returning to a default instruction, and discarding an instruction.

With reference to the third aspect, in an implementation, the method further includes: displaying, by the second device, an interface of an application. After the obtaining, by the second device, a first image based on a preset first image capture parameter, the method further includes: displaying, by the second device, the first image on the interface.

The slave device may provide a preview interface and display an image captured by a called camera of the slave device. In this way, a user who is using the slave device can be notified that the current camera of the slave device is being remotely called, thereby improving user experience.

With reference to the third aspect, in an implementation, after the receiving, by the second device, a first instruction that carries a second image capture parameter and that is sent by the first device, the method further includes: displaying, by the second device, the second image on the interface, and stopping displaying the first image.

When the slave device adjusts display effect of an image according to an instruction sent by the master device, the slave device may display an adjusted image. In this case, the user who is using the slave device can also observe adjustment effect of the image.

According to a fourth aspect, an embodiment of this application provides an electronic device, including a memory and one or more processors. The memory is coupled to the one or more processors. The memory is configured to store computer program code. The computer program code includes computer instructions. The one or more processors call the computer instructions to enable the electronic device to perform the following operations: displaying an interface of an application; receiving a first image sent by a second device, where the first image is obtained by the second device based on a preset first image capture parameter; displaying the first image on the interface; receiving a first operation performed on the interface; receiving, after receiving the first operation on the interface, a second image sent by the second device; and displaying a third image on the interface in response to the first operation, and stopping displaying the first image. The third image is obtained by the electronic device by processing the second image based on a second image capture parameter indicated by the first operation, or the third image is the second image and the second image is obtained by the second device based on a second image capture parameter indicated by the first operation. The second image capture parameter is within an image capture capability range of the electronic device.

With reference to the fourth aspect, in an implementation, before the receiving a first operation performed on the interface, the one or more processors are further configured to call the computer instructions to enable the electronic device to perform the following operations: receiving the first image sent by the second device, where the first image is obtained by the second device based on the preset first image capture parameter; and displaying the first image on the interface. The one or more processors are specifically configured to call the computer instructions to enable the electronic device to perform the following operations: displaying the third image on the interface in response to the first operation, and stopping displaying the first image.

With reference to the fourth aspect, in an implementation, before the receiving the first image sent by the second device, the one or more processors are further configured to call the computer instructions to enable the electronic device to perform the following operation: sending a first request to the second device. The first request is for triggering the second device to obtain the first image.

With reference to the fourth aspect, in an implementation, the third image is obtained by the electronic device by processing the second image based on the second image capture parameter indicated by the first operation, and the second image is obtained by the second device based on the first image capture parameter.

With reference to the fourth aspect, in an implementation, the third image is obtained by the electronic device by processing the second image based on the second image capture parameter indicated by the first operation. Before the receiving a second image sent by the second device, the one or more processors are further configured to call the computer instructions to enable the electronic device to perform the following operation: sending the second image capture parameter to the second device. The second image is obtained by the second device based on the second image capture parameter.

With reference to the fourth aspect, in an implementation, the second image is obtained by the second device based on the second image capture parameter. If the second image capture parameter is outside an image capture capability range of the second device, the second image is specifically obtained by the second device based on a third image capture parameter. The third image capture parameter is a parameter that is within the image capture capability range of the second device and that is closest to the second image capture parameter, or the third image capture parameter is a preset image capture parameter.

With reference to the fourth aspect, in an implementation, the interface further displays a plurality of image capture options, and image capture parameters corresponding to the plurality of image capture options are within the image capture capability range of the first device. The first operation includes an operation performed on an image capture option. The second image capture parameter includes an image capture parameter corresponding to the image capture option on which the first operation is performed.

With reference to the fourth aspect, in an implementation, before the receiving the first image sent by the second device, the one or more processors are further configured to call the computer instructions to enable the electronic device to perform the following operation: displaying a fourth image on the interface. The fourth image is obtained by the first device. The one or more processors are specifically configured to call the computer instructions to enable the electronic device to perform the following operations: displaying the first image on the interface, and stopping displaying the fourth image.

With reference to the fourth aspect, in an implementation, the application includes one or more of the following: a video call application, a photographing application, a live streaming application, an image recognition application, and an image translation application.

With reference to the fourth aspect, in an implementation, the application is a video call application. After the displaying a third image on the interface in response to the first operation, and stopping displaying the first image, the one or more processors are further configured to call the computer instructions to enable the electronic device to perform the following operation: sending the third image to a server corresponding to the video call application, for the server to send the third image to a third device.

According to a fifth aspect, an embodiment of this application provides an electronic device, including a memory and one or more processors. The memory is coupled to the one or more processors. The memory is configured to store computer program code. The computer program code includes computer instructions. The one or more processors call the computer instructions to enable the electronic device to perform the following operations: receiving a second operation; receiving, in response to the second operation when a communication connection is established between the electronic device and a second device, a first image sent by the second device; and displaying the first image on an interface of an application, and skipping displaying a fourth image. Before the communication connection is established with the second device, the second operation is for the electronic device to display the fourth image, and the fourth image is obtained by the electronic device.

With reference to the fifth aspect, in an implementation, after the receiving, by a first device, a second operation, the one or more processors are further configured to call the computer instructions to enable the electronic device to perform the following operation: displaying, by the first device, the fourth image on the interface. Before the receiving, by the first device, a first image sent by the second device, the one or more processors are further configured to call the computer instructions to enable the electronic device to perform the following operation: receiving, by the first device, a third operation. The third operation is for triggering the first device to obtain the first image.

In this way, a communication connection may be established between the master device and the slave device in advance, and an image displayed by the master device is not affected by the communication connection. When the master device is in a photographing or video call scenario, the master device still displays, by default, the image captured by a camera of the master device. After the master device receives an operation of switching a camera by the user, the master device switches from displaying the image captured by the camera of the master device to displaying an image obtained by the slave device.

With reference to the fifth aspect, in an implementation, after the displaying the first image on an interface of an application, the one or more processors are further configured to call the computer instructions to enable the electronic device to perform the following operations: receiving a first operation performed on the interface; receiving, after receiving the first operation on the interface, a second image sent by the second device; and displaying a third image on the interface in response to the first operation. The third image is obtained by the electronic device by processing the second image based on a second image capture parameter indicated by the first operation, or the third image is the second image and the second image is obtained by the second device based on a second image capture parameter indicated by the first operation. The second image capture parameter is within an image capture capability range of the electronic device.

With reference to the fifth aspect, in an implementation, the second image is obtained by the second device based on the second image capture parameter. If the second image capture parameter is outside an image capture capability range of the second device, the second image is specifically obtained by the second device based on a third image capture parameter. The third image capture parameter is a parameter that is within the image capture capability range of the second device and that is closest to the second image capture parameter, or the third image capture parameter is a preset image capture parameter.

With reference to the fifth aspect, in an implementation, before the receiving a first operation performed on the interface, the one or more processors are further configured to call the computer instructions to enable the electronic device to perform the following operations: receiving the first image sent by the second device, where the first image is obtained by the second device based on a preset first image capture parameter; and displaying the first image on the interface. The one or more processors are specifically configured to call the computer instructions to enable the electronic device to perform the following operations: displaying the third image on the interface in response to the first operation, and stopping displaying the first image.

With reference to the fifth aspect, in an implementation, after the receiving a second operation, the one or more processors are further configured to call the computer instructions to enable the electronic device to perform the following operation: sending a first request to the second device. The first request is for triggering the second device to obtain the first image.

According to a sixth aspect, an embodiment of this application provides a computer-readable storage medium, including instructions. When the instructions are run on an electronic device, the electronic device is enabled to perform the method according to any one of the implementations of the first aspect or the second aspect.

By implementing the image capture method provided in embodiments of this application, a master device may obtain and display, by establishing a communication connection with a slave device, an image captured by the slave device, and the master device may further change display effect of the image. The display effect may be adjusted by the master device, the slave device, or the master and slave devices together. The master device may deliver, within an image capture capability range of the master device, an image capture instruction for adjusting the display effect, and the slave device may adjust the image within an image capture capability range of the slave device, thereby extending a scenario of collaborative image capture of the master and slave devices, and enhancing image capture experience of a user while providing multi-angle image capture experience for the user.

BRIEF DESCRIPTION OF DRAWINGS

FIG. 5A to FIG. 5D, FIG. 6A to FIG. 6C, FIG. 7A to FIG. 7C, FIG. 8A to FIG. 8G, FIG. 9A to FIG. 9C, and FIG. 10A to FIG. 10E are schematic diagrams of some user interfaces according to embodiments of this application;

DESCRIPTION OF EMBODIMENTS

Figure 1:
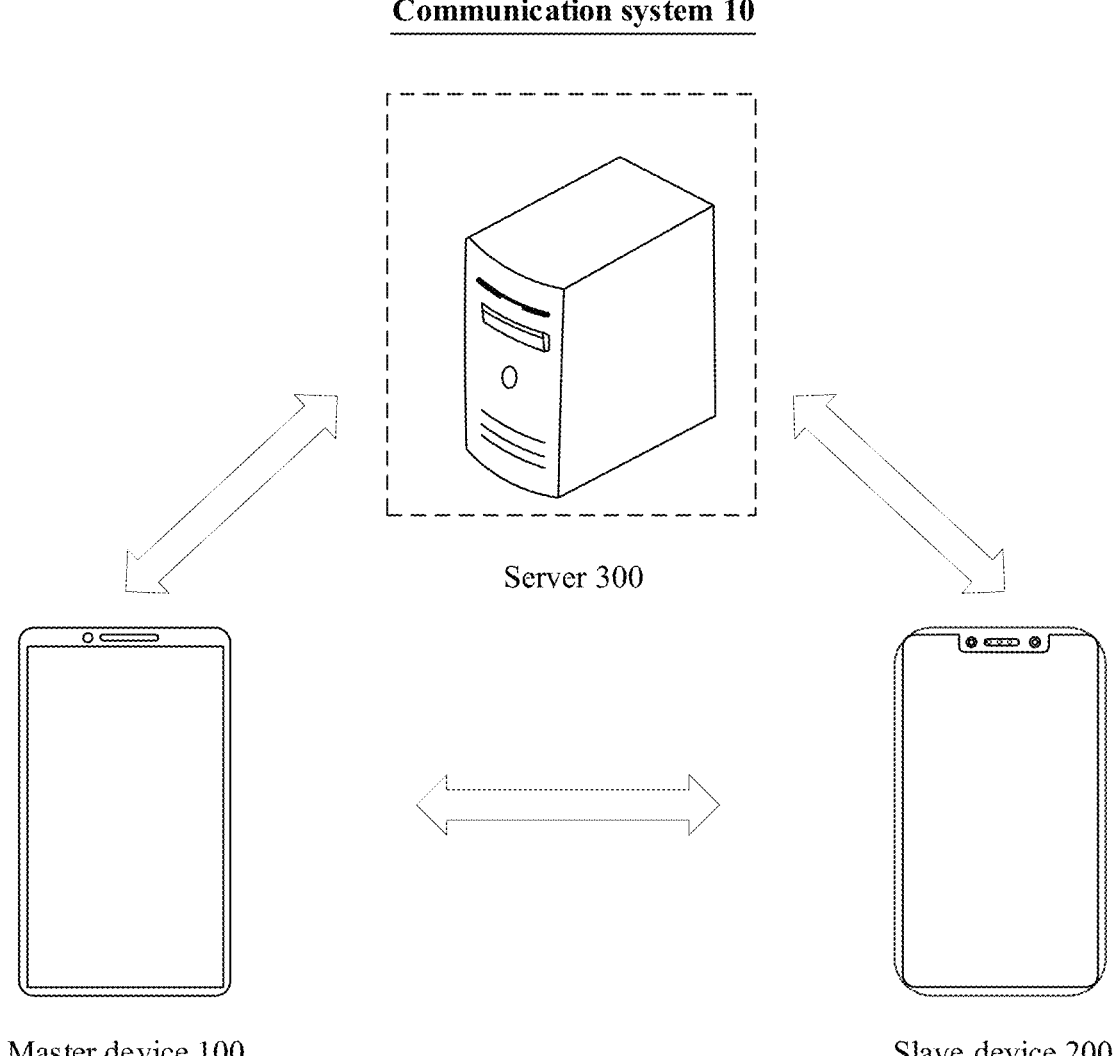
FIG. 1 shows a communication system 10 according to an embodiment of this application.

The following clearly describes in detail the technical solutions in embodiments of this application with reference to the accompanying drawings. In the descriptions of embodiments of this application, unless otherwise specified, "/" indicates "or". For example, A/B may indicate A or B. The term "and/or" in this specification merely describes an association relationship between associated objects and indicates that three relationships may exist. For example, A and/or B may indicate the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The term "user interface (user interface, UI)" in the following embodiments of this application is a medium interface for interaction and information exchange between an application or operating system and a user, and implements conversion between an internal form of information and a form that can be accepted by the user. The user interface is source code written in a specific computer language, for example, Java or an extensible markup language (extensible markup language, XML). The interface source code is parsed and rendered on an electronic device, to finally present content that can be recognized by the user.

The user interface is usually presented in a form of a graphical user interface (graphical user interface, GUI), which is a user interface that is related to a computer operation and that is displayed in a graphical form. The user interface may be a visible interface element, for example, a text, an icon, a button, a menu, a tab, a text box, a dialog box, a status bar, a navigation bar, or a Widget, that is displayed on a display screen of the electronic device.

To obtain more diversified image capture angles, one solution is multi-device collaborative image capture.

The multi-device collaborative image capture relates to a master device and a slave device. First, the master device may send a command to the slave device, for example, a command of turning on a camera. The slave device may activate, in response to the command, the camera to capture an image, compress the captured image, and send the compressed image to the master device. Finally, the master device may display, on a preview interface, the image captured by the slave device, to obtain more diversified image capture angles.

However, when obtaining more diversified image capture angles, the master device can only preview an image captured by the slave device, but cannot control or adjust the image captured by the slave device, for example, perform an adjustment operation of zooming, turning on a flash, adding a filter, or adding a sticker.

To resolve the foregoing problem, an embodiment of this application provides an image capture method. The image capture method relates to a master device and a slave device. In the method, the master device may establish a communication connection with the slave device. After the connection is established, the master device may obtain an image captured by a camera of the slave device, and display the image on a user interface of the master device. In addition, the master device may further receive a control operation of the user for the image of the slave device, and in response to the control operation, the master device changes display effect of the image.

There is one master device, and there may be one or more slave devices. The slave device may be any electronic device with a camera, for example, a mobile phone, a tablet, a computer, an uncrewed aerial vehicle, a surveillance camera, or a sports camera. The master device may first search for a device with a camera, and then select one or more devices from a plurality of found devices as the slave devices.

The communication connection between the master device and the slave device may be a wired connection or a wireless connection. The slave device may send, to the master device based on the communication connection, an image captured by the slave device. The wireless connection may be a short-distance connection like a high-fidelity wireless communication (wireless fidelity, Wi-Fi) connection, a Bluetooth connection, an infrared connection, an NFC connection, or a ZigBee connection, or may be a long-distance connection. The long-distance connection includes but is not limited to long-distance connections of a mobile network based on 2G, 3G, 4G, 5G, and subsequent standard protocols. For example, the master device and the slave device may log in to a same user account (for example, a Huawei account), and then perform a long-distance connection by using a server.

The control operation of the user for the image of the slave device means an operation of adjusting the display effect of the image by the user, for example, an operation of adjusting a zoom ratio, an operation of changing a photographing mode, or an operation of adding a filter. The operation is an operation initiated by the user within an image capture capability range of the master device. In other words, the user adjusts the display effect of the image based on an image capture capability of the master device. For example, when a zoom range of the master device is 1× to 10×, a control operation that can be initiated by the user can only be a zoom operation with a zoom ratio between 1× and 10×.

Specifically, adjusting the display effect of the image is changing an image capture parameter of the image. When an electronic device responds to a specific photographing mode or enables a specific algorithm, the electronic device adjusts the image capture parameter. For example, when a camera enables a face mode function, the electronic device may perform operations such as decreasing a focal length parameter in the image capture parameter, increasing an aperture, turning on a fill light, and enabling a default beauty algorithm.

That the master device changes the display effect of the image includes but is not limited to the following three cases:

1. The display effect is adjusted by the master device.

The master device may correspondingly adjust, in response to a control operation of adjusting the display effect by the user, the image captured by the slave device.

In this case, the adjustment of the display effect means adjustment of a software parameter involved in image processing. The software parameter includes one or more of the following: a digital zoom value, a size for image cropping, a color temperature calibration mode of an image, whether to perform image denoising, a beauty/body shaping type, a filter type, a sticker option, whether to enable selfie mirroring, and the like. The digital zoom value may be 10× zoom or 15× zoom. The size for image cropping may be 3:3, 3:4, or 9:16. The color temperature calibration mode may be a daylight, fluorescent, incandescent, shadow, or cloudy calibration mode. The beauty/body shaping type may be face slimming, body slimming, skin smoothing, whitening, eye enlarging, or acne removal. The filter type may be Japanese-style, texture, bright, soft, or cyberpunk. The sticker may be an emoji, animal, nature, or illustration sticker.

In this way, the master device can adjust, with an image capture capability of the master device, the image captured by the slave device, to obtain display effect that cannot be obtained through adjustment by the slave device.

2. The display effect is adjusted by the slave device.

The master device generates, in response to a control operation of adjusting the display effect by the user, an instruction for adjusting the display effect, and sends the instruction to the slave device. The slave device obtains an image according to the instruction and sends the adjusted image to the master device.

In this case, the adjustment of the display effect may be not only adjustment of a software parameter involved in image processing, but also adjustment of a hardware parameter of a camera involved in image capture. The hardware parameter includes one or more of the following: a quantity of cameras, a type of a camera, an optical zoom value, whether to enable optical image stabilization, an aperture size, whether to turn on a flash, whether to turn on a fill light, a shutter time, an ISO photosensitive value, a pixel, a video frame rate, and the like. The type of the camera may include but is not limited to a common camera, a wide-angle camera, or an ultra-wide-angle camera. The optical zoom value may be 1× zoom, 2× zoom, or 5× zoom. The aperture size may be f/1.8, f/1.9, or f/3.4. The shutter time may be 1/40, 1/60, 1/200, or the like.

In addition, the adjustment of the display effect may further include adjustment of a combination parameter of some hardware parameters and software parameters, such as a hybrid zoom range, a night mode, a portrait mode, time-lapse, slo-mo, a panoramic mode, or HDR.

In this way, the master device can control the slave device to adjust the display effect of the image, and the slave device can adjust the display effect of the image based on an image capture capability of the slave device.

3. The display effect is adjusted by the master and slave devices together.

The master device may further adjust an image adjusted by the slave device, or one part of adjustment (for example, adjustment of a software parameter) is completed by the master device, and the other part of the adjustment (for example, adjustment of a hardware parameter) is completed by the slave device.

In this way, the master and slave devices can collaboratively adjust the display effect to be as close as possible to display effect required by the user, which avoids a case in which the master device or the slave device cannot adjust the display effect alone.

Further, when the display effect is adjusted by the slave device, or the display effect is adjusted by the slave device first and then further adjusted by the master device based on the adjustment by the slave device, after the master device sends an instruction for adjusting the display effect to the slave device, the slave device may further perform compatibility processing on the instruction, so that the slave device can effectively complete adjustment of corresponding display effect in response to the processed instruction. Because device types and device models of the master device and the slave device may be different, in response to a user operation of adjusting display effect by a user, the master device may generate some instructions that are not supported or cannot be recognized by the slave device, and the slave device cannot respond to these instructions to adjust display effect of an image. The master device performs compatibility processing on an instruction, so that the slave device can respond to an operation performed by the user on the master device, to implement control by the master device on adjustment of display effect by the slave device.

In this case, an image capture parameter used by the slave device for adjustment may be different from an image capture parameter indicated by the user operation received by the master device. For example, when the master device receives a zoom operation of zooming in by 5× by the user, display effect adjusted by the slave device may be zoom effect of zooming in by 3×. When the master device receives an operation of adding a filter by the user, a filter added by the slave device may be different from the filter added by the user. The filter added by the slave device may be similar to the filter added by the user, or a default filter is added by the slave device.

In this way, when the slave device participates in adjustment of the display effect, the slave device may complete the adjustment of the display effect as much as possible, to meet an image capture requirement of the user as much as possible, thereby improving user experience.

It can be learned that in the foregoing three cases, the master device may adjust an image of the slave device based on an image capture capability of the master device, or the master device controls the slave device to adjust an image, without taking an image capture capability of the slave device into account, thereby enhancing effect of controlling the slave device by the master device, and improving control efficiency.

In embodiments of this application, that the master device displays the image of the slave device means that the image of the slave device is transmitted through an original data stream channel of the master device, so that the image of the slave device is displayed on the user interface of the master device. The original data stream channel of the master device means a data stream channel used by the master device to display an image, captured by a camera of the master device, on a display screen. In this way, an application layer of the master device does not need to sense whether the displayed image is from the master device or the slave device. A camera of the slave device is equivalent to a remote camera of the master device. The master device can obtain the image of the slave device without modifying a manner of calling a system interface by a third-party application, that is, without adaptation of the third-party application, thereby extending a camera usage scenario of the master and slave devices.

In conclusion, by implementing the image capture method, effect of controlling the slave device by the master device is enhanced, and the master device can provide a user with multi-angle image capture experience and facilitate an image capture requirement of the user, thereby meeting diversified image capture requirements of the user.

First, the following describes a communication system 10 according to an embodiment of this application.

FIG. 1 shows a structure of the communication system 10.

As shown in FIG. 1, the communication system 10 includes a master device 100 and a slave device 200. There is one master device, and there may be one or more slave devices.

Each of the master device 100 and the slave device 200 is an electronic device with a camera configured. A quantity of cameras of the master device 100 and a quantity of cameras of the slave device 200 are not limited in embodiments of this application. For example, the slave device 200 may be configured with five cameras (two front-facing cameras and three rear-facing cameras).

In this embodiment of this application, the electronic device may be a portable terminal device carrying iOS, Android, Microsoft, or another operating system. For example, the portable terminal device may be a mobile phone, a tablet computer, or a wearable device. Alternatively, the electronic device may be a non-portable terminal device like a laptop (laptop) having a touch-sensitive surface or a touch panel, or a desktop computer having a touch-sensitive surface or a touch panel. For example, in the example shown in FIG. 1, both the master device 100 and the slave device 200 are mobile phones.

The master device 100 is configured to establish a communication connection with the slave device 200, obtain and display an image captured by a camera of the slave device 200 or obtain and display an image adjusted by the slave device 200, and change, when receiving a control operation of a user for the image captured by the slave device 200, display effect of the image in response to the control operation. In addition, the display effect may be all or partially adjusted by the master device 100.

The slave device 200 is configured to turn on a camera and capture an image by using the camera, then send the captured image to the master device 100, receive an instruction for adjusting display effect sent by the master device 100, adjust the display effect of the image according to the instruction, and send the adjusted image to the master device 100. In addition, the slave device 200 may further perform compatibility processing on the instruction sent by the master device 100 to obtain an instruction that can be recognized or responded by the slave device 200.

The communication connection established between the master device 100 and the slave device 200 may be a wired connection or a wireless connection.

In some embodiments, the wireless connection may be a short-distance connection like a high-fidelity wireless communication (Wi-Fi) connection, a Bluetooth connection, an infrared connection, an NFC connection, or a ZigBee connection. The master device 100 may directly send the instruction for adjusting the display effect to the slave device 200 through the short-distance connection. The slave device 200 may respond to the instruction delivered by the master device 100, and return the adjusted image to the master device 100. Then, the master device 100 may display the image returned by the slave device 200. In addition, the master device 100 may further complete video recording, photo shooting, and forwarding tasks by using the foregoing image. Herein, for specific implementations of sending, by the master device 100, the instruction for adjusting the display effect to the slave device 200, and adjusting, by the slave device 200, the image according to the instruction, refer to detailed descriptions in subsequent method embodiments, and details are not described herein.

In some other embodiments, the wireless connection may be a long-distance connection, and the long-distance connection includes but is not limited to a mobile network that supports 2G, 3G, 4G, 5G, and subsequent standard protocols.

Optionally, the communication system 10 shown in FIG. 1 may further include a server 300. The master device 100 and the slave device 200 may log in to a same user account (for example, a Huawei account), and then perform a long-distance connection by using the server 300 (for example, a multi-device collaborative image capture server provided by Huawei). The server 300 may be configured to transmit data between the master device 100 and the slave device 200. To be specific, the master device 100 may send a control command to the slave device 200 by using the server 300. Similarly, the slave device 200 may send an image to the master device 100 by using the server 300.

Figure 2:
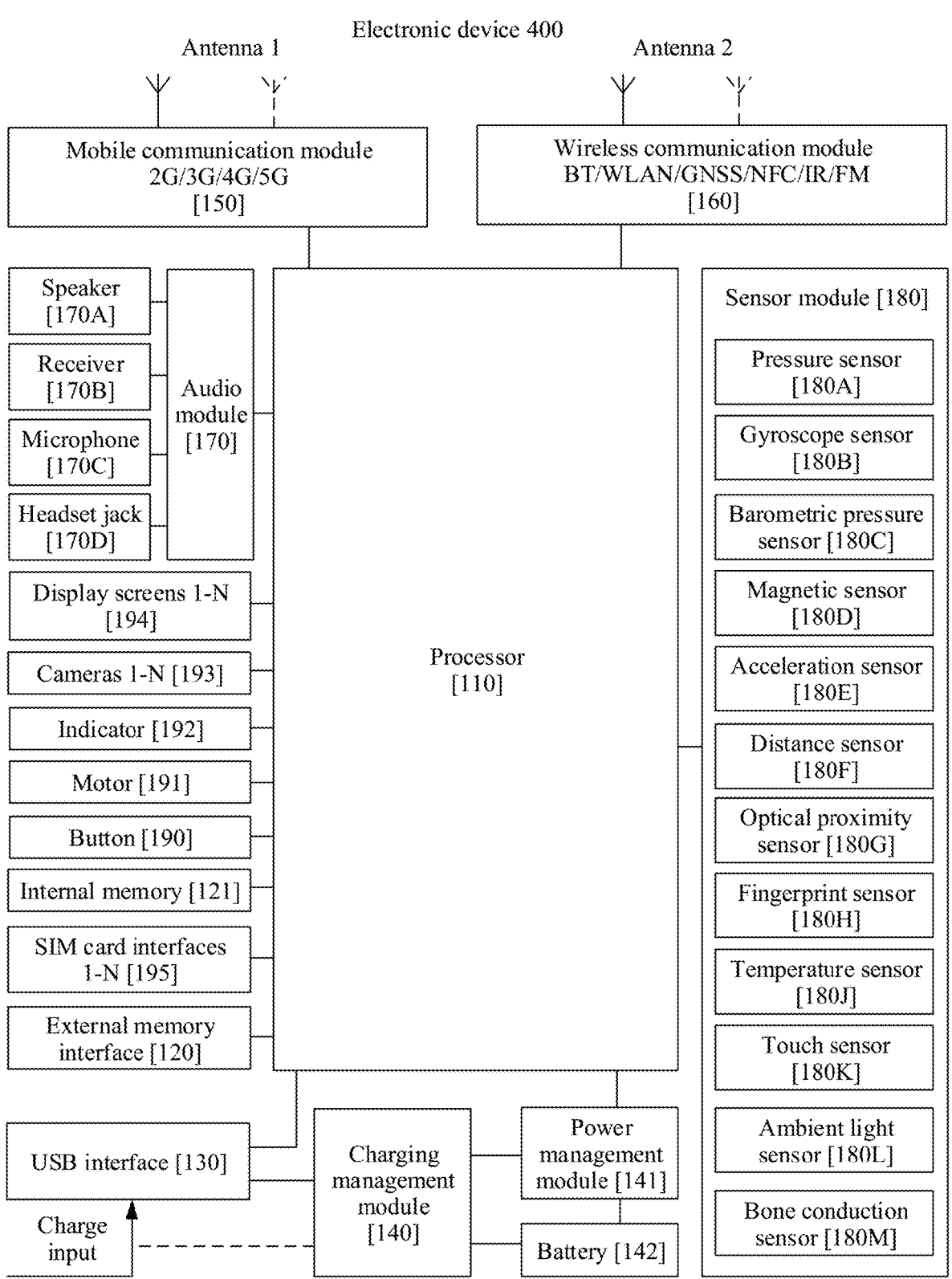
FIG. 2 is a schematic diagram of a hardware structure of an electronic device 400 according to an embodiment of this application.

FIG. 2 is a schematic diagram of a hardware structure of an electronic device 400.

The electronic device 400 may be the master device 100 or the slave device 200 in the communication system 10 shown in FIG. 1.

The electronic device 400 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an on-board device, a smart home device, and/or a smart city device. A specific type of the electronic device is not limited in embodiments of this application. In addition, when the electronic device 400 is the slave device 200, the electronic device 400 may be a device with a simple hardware structure and limited memory and running space, for example, a camera or a sports camera.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to control instruction reading and instruction execution.

A memory configured to store instructions and data may be further disposed in the processor 110. In some embodiments, the memory in the processor 110 is a cache. The memory can store instructions or data that is just used or cyclically used by the processor 110. If the processor 110 needs to use the instructions or data again, the processor may directly call the instructions or data from the memory. This avoids repeated access and reduces waiting time of the processor 110, thereby improving system efficiency.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be reused to improve antenna utilization. For example, the antenna 1 may be reused as a diversity antenna of a wireless local area network. In some other embodiments, the antenna may be used in combination with a tuning switch.

The mobile communication module 150 may provide a solution of wireless communication including 2G/3G/4G/5G or the like that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal processed by the baseband processor is transmitted to the application processor. The application processor outputs a sound signal through an audio device (which is not limited to the speaker 170A, the receiver 170B, or the like), or displays an image or a video through the display screen 194. In some embodiments, the modem processor may be an independent component. In some other embodiments, the modem processor may be independent of the processor 110, and is disposed in a same device with the mobile communication module 150 or another functional module.

The wireless communication module 160 may provide a solution of wireless communication that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, demodulates and filters an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can be in communication with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD- SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculations, and is configured for graphics rendering. The processor 110 may include one or more GPUs, which execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-oLEd, a quantum dot light-emitting diode (quantum dot light-emitting diode, QLED), or the like. In some embodiments, the electronic device 100 may include one or N display screens 194, where N is a positive integer greater than 1.

The electronic device 100 may implement an image capture function by using the ISP, the camera 193, the video codec, the GPU, the display screen 194, the application processor, and the like.

The ISP is configured to process data fed back from the camera 193. For example, during photo shooting, when a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, skin tone of the image. The ISP may further perform parameter optimization on exposure and color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard RGB or YUV format. In some embodiments, the electronic device 100 may include one or N cameras 193, where N is a positive integer greater than 1.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like. The non-volatile memory may include a magnetic disk storage device and a flash memory (flash memory).

The electronic device 100 may implement an audio function by using the audio module 170, the speaker 170A, the receiver 170B, the microphone 170C, the headset jack 170D, the application processor, and the like, for example, music playing or recording.

The distance sensor 180F is configured to measure a distance. The electronic device 100 may measure a distance by an infrared ray or a laser. In some embodiments, in a photographing scenario, the electronic device 100 may measure a distance by using the distance sensor 180F to implement quick focusing.

The touch sensor 180K may also be referred to as a "touch component". The touch sensor 180K may be disposed in the display screen 194. The touch sensor 180K and the display screen 194 form a touchscreen, which is also referred to as a "touch control screen". The touch sensor 180K is configured to detect a touch operation performed on or near the touch sensor 180K. The touch sensor may transfer the detected touch operation to the application processor to determine a type of a touch event. A visual output related to the touch operation may be provided by the display screen 194. In some other embodiments, the touch sensor 180K may be disposed on a surface of the electronic device 100 at a position different from that of the display screen 194.

When the electronic device 400 is the master device 100:

The processor 110 may be configured to generate an instruction for adjusting display effect.

The mobile communication module 150 and the wireless communication module 160 may be configured to provide a communication service to the master device 100. Specifically, in this embodiment of this application, the master device 100 may establish, by using the mobile communication module 150 or the wireless communication module 160, a communication connection with another electronic device (that is, the slave device 200) having the camera 193. In addition, through the connection, the master device 100 may send a command for adjusting display effect to the slave device 200, and receive an image returned by the slave device 200.

The ISP, the camera 193, the video codec, the GPU, the display screen 194, the application processor, and the like provide functions of photographing and displaying an image for the master device 100. When the master device 100 turns on the camera 193, the master device 100 may obtain an optical image captured by the camera 193, and convert an optical signal into an electrical signal by using the ISP. In an experiment of controlling display effect in this embodiment of this application, the ISP may further adjust an image capture parameter like exposure or color temperature of a photographing scene, and perform image processing and parameter optimization on noise, brightness, and skin tone of an image. The video codec may be configured to compress or decompress a digital video.

The master device 100 may implement a display function by using the GPU, the display screen 194, the application processor, and the like. Specifically, the electronic device may display, by using the display screen 194, an image or the like captured by the camera 193. In addition, an image that is sent by the slave device 200 and that is received by the master device 100 may also be displayed by using the display screen 194 and the like. By using the touch sensor 180K, that is, the "touch panel", the master device 100 may respond to a user operation performed on a user interface control.

When the electronic device 400 is the slave device 200:

The processor 110 may be configured to perform compatibility processing on an instruction.

The mobile communication module 150 and the wireless communication module 160 may be configured to provide a communication service to the slave device 200. Specifically, the slave device 200 may establish a communication connection with the master device 100 by using the mobile communication module 150 or the wireless communication module 160. Through the connection, the slave device 200 receives a command for adjusting display effect sent by the master device 100, may adjust the display effect of an image in response to the command, and send, to the master device 100, a processed image that is captured by the camera 193.

The ISP, the camera 193, and the video codec may provide functions of photographing and sending an image for the slave device 200. When the slave device 200 sends an image to the master device 100, the video codec may be configured to compress or decompress a digital video. The slave device 200 may encode, by using the video codec, a photographed file collected by the slave device 200 into an image stream, and then send the image stream to the master device 100.

In some embodiments, the slave device 200 may also display an image captured by the camera 193 of the slave device 200. In this case, the slave device 200 may implement a display function by using the GPU, the display screen 194, the application processor, and the like. In addition, by using the touch sensor 180K, the slave device 200 may respond to a user operation performed on a user interface control.

Figure 3:
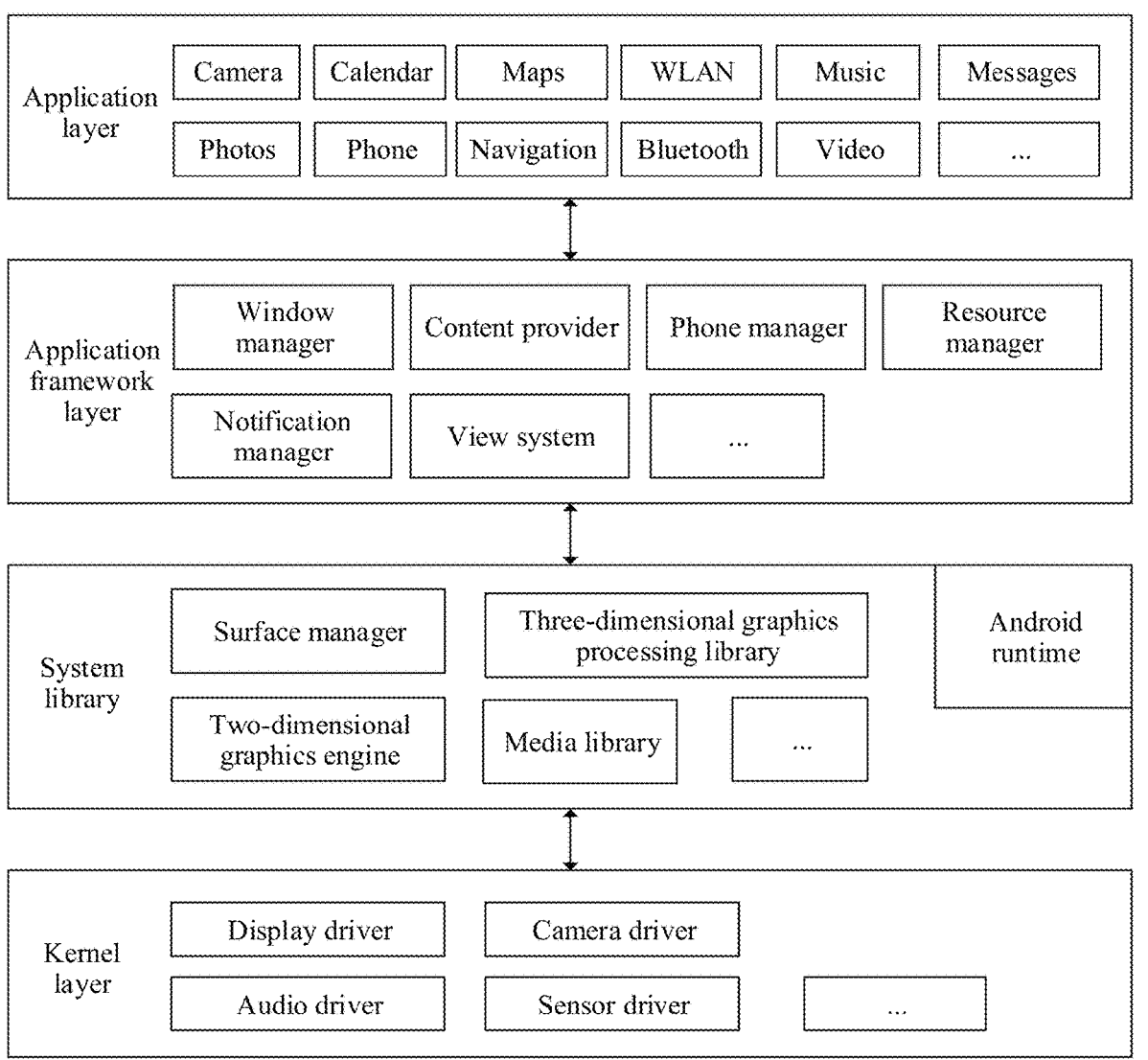
FIG. 3 is a block diagram of a software structure of an electronic device 400 according to an embodiment of this application.

FIG. 3 is a block diagram of a software structure of an electronic device 400 according to an embodiment of this application.

In a layered architecture, software is divided into several layers, and each layer has a clear role and task. The layers are in communication with each other through a software interface. In some embodiments, an Android system is divided into four layers: an application layer, an application framework layer, Android runtime (Android runtime) and a system library, and a kernel layer from top to bottom.

The application layer may include a series of application packages.

As shown in FIG. 3, the application packages may include applications such as Camera, Photos, Calendar, Phone, Maps, Navigation, WLAN, Bluetooth, Music, Video, and Messages.

The application framework layer provides an application programming interface (application programming interface, API) and a programming framework for the applications at the application layer. The application framework layer includes some pre-defined functions.

As shown in FIG. 3, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmark, an address book, and the like.

The view system includes a visual control like a control displaying text or a control displaying an image. The view system may be configured to build an application. A display interface may include one or more views. For example, a display interface including a short-message notification icon may include a view displaying text and a view displaying an image.

The phone manager is configured to provide a communication function for the electronic device 100, for example, management of a call status (including answered, ended, or the like).

The resource manager provides various resources for an application, such as a localized character string, an icon, a picture, a layout file, and a video file.

The notification manager enables an application to display notification information in a status bar, and may be configured to convey a notification message. The notification message may automatically disappear after a short pause without a user interaction. For example, the notification manager is configured to notify download completion, provide a message notification, and the like. The notification manager may also provide a notification that appears in a status bar at the top of the system in a form of a graph or a text scroll bar, for example, a notification of an application run on a back end, or may provide a notification that appears on a screen in a form of a dialog window. For example, text information is displayed in the status bar, an alert sound is emitted, the electronic device vibrates, or the indicator light blinks.

The Android runtime includes a core library and a virtual machine. The Android runtime is responsible for scheduling and management of the Android system.

The core library includes two parts: a functional function that needs to be called by Java language and a core library of Android.

The application layer and the application framework layer are run on the virtual machine. The virtual machine executes Java files at the application layer and the application framework layer as binary files. The virtual machine is configured to implement functions such as object life cycle management, stack management, thread management, security and exception management, and garbage collection.

The system library may include a plurality of functional modules, such as a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in various common audio and video formats, static image files, and the like. The media library can support various audio and video encoding formats, such as MPEG4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a capture and photo shooting scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and recognizes a control corresponding to the input event. For example, the touch operation is a single-tap operation and a control corresponding to the single-tap operation is a control of a camera application icon. The camera application calls an interface at the application framework layer, to start the camera application. Then, a camera driver is started by calling the kernel layer. A static image or a video is captured by the camera 193.

It may be understood that when the slave device 200 is a device with limited memory and running space, for example, a camera or a sports camera, the electronic device 400 may include fewer software layers than the foregoing description, and different layers may include fewer modules than the foregoing description.

Based on the software and hardware structures of the system 10 and the master device 100 described above, the following describes in detail an image capture method provided in an embodiment of this application.

The image capture method provided in this embodiment of this application may be applied to a plurality of scenarios, including but not limited to:

(1) Photographing Scenario

In a photographing scenario, the master device 100 may perform photo shooting and video recording by using a system camera application or a third-party photographing application. The master device 100 may establish a communication connection with the slave device 200, to obtain, by using the system camera application or the third-party photographing application, an image captured by the slave device 200, and display, according to a control operation of adjusting display effect by a user, an adjusted image.

In the photographing scenario, by using the image capture method provided in this embodiment of this application, the user may be provided with more free angles, and the user may further adjust, according to the operation on the master device 100, the display effect of the image captured by the slave device 200.

(2) Video Surveillance Scenario

In a video surveillance scenario, the slave device 200 may be a surveillance camera device. After starting a camera application, the master device 100 may obtain an image captured by the slave device 200. In addition, the master device 100 adjusts display effect of the slave device 200. For example, the master device 100 may receive, for example, a zoom operation of a user, to zoom in or zoom out on an image of the slave device 200.

In the video surveillance scenario, by using the image capture method provided in this embodiment of this application, the user may place the slave device 200 at a position that has a large field of view and that is currently out of reach of the user. In this way, the user can easily view a surveillance status of the slave device 200 through a screen of the master device 100, and can adjust, by using the master device 100, the display effect of the image captured by the slave device 200.

(3) Video Call Scenario

In a video call scenario, when making a video call with another device, the master device 100 may replace, with an image captured by the slave device 200, an image that is captured by a local end and displayed on a video call interface. Alternatively, before making a video call with another device, the master device 100 may establish a communication connection with the slave device 200. In this way, when the master device 100 makes a video call with another device, the master device 200 may directly display an image captured by the slave device 200, and a video call interface of the another device may also display, through this video call, the image captured by the slave device 200. In addition, the master device 100 may further receive a control operation of adjusting display effect by a user, and adjust the displayed image.

In the video call scenario, by using the image capture method provided in this embodiment of this application, based on the communication connection established between the master device 100 and the slave device 200, the user may view the image of the slave device 200 through a user interface of the master device 100, and may also send, by making a video call, the image of the slave device 200 to a peer device being in the video call. In addition, the master device 100 and another device can simultaneously obtain the image captured by the slave device 200, without a need for the slave device 200 to have a video call application of the master device 100 and the another device. The user may further adjust, by using the master device 100, display effect of the image captured by the slave device 200.

Not limited to the foregoing scenarios, the image capture method provided in this embodiment of this application may be applied to any scenario in which an image needs to be captured by using a camera, for example, a code scanning scenario, an object recognition scenario, or an image translation scenario. In addition, the image capture method may be further applied to any third-party application with an image capture function, for example, a photographing beautification application, a social application, an office application, or a shopping application.

The following describes an image capture method according to an embodiment of this application by using a video call scenario as an example.

Figure 4:
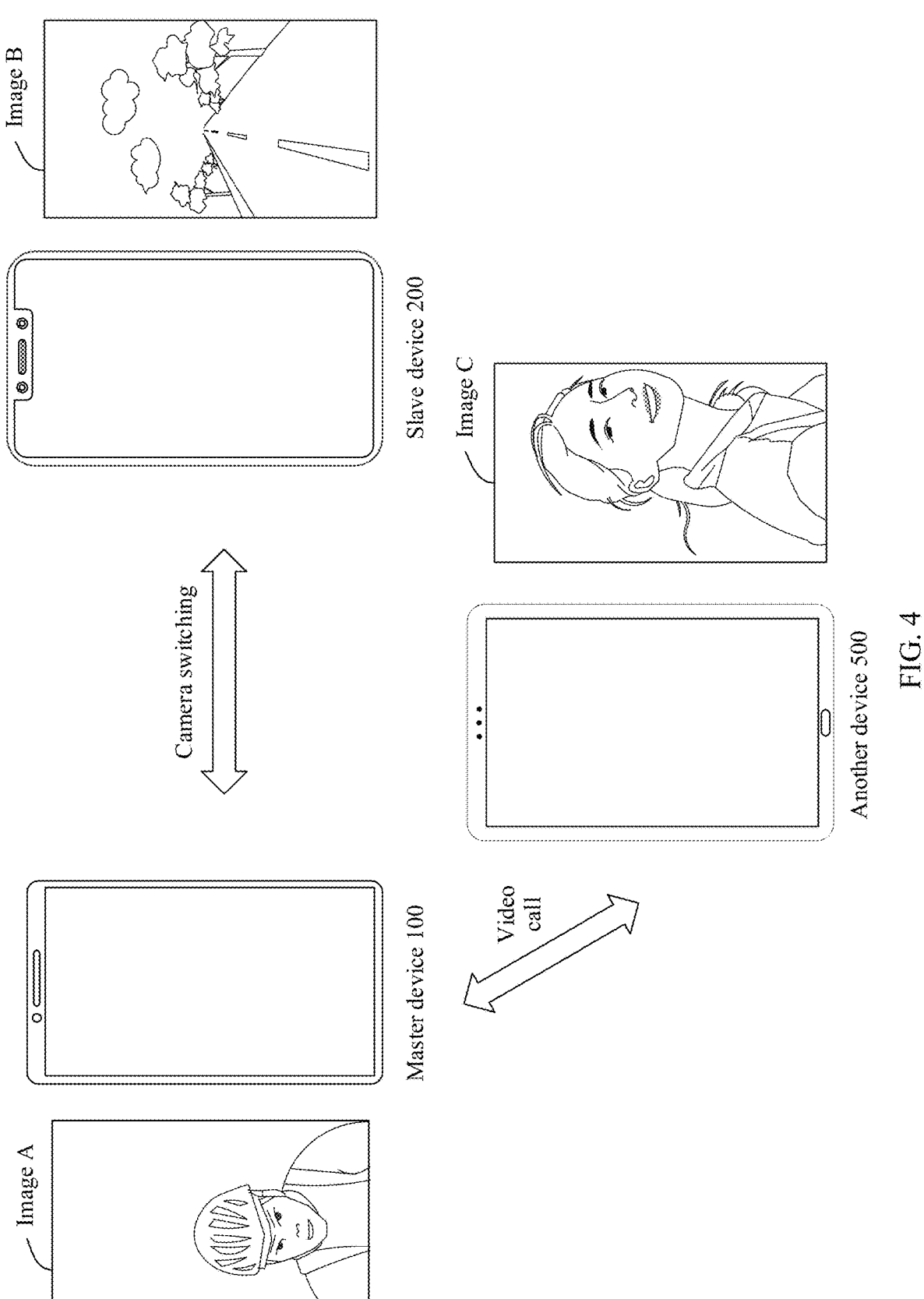
FIG. 4 is a schematic diagram of a video call scenario according to an embodiment of this application.

FIG. 4 shows an example of a video call scenario according to an embodiment of this application.

As shown in FIG. 4, the video call scenario includes: a master device 100, a slave device 200, and another device 500 that makes a video call with the master device 100. An image A is an image captured by a camera of the master device 100, an image B is an image captured by a camera of the slave device 200, and an image C is an image captured by a camera of the another device 500. For example, the master device 100 answers a video call made by the another device 500. According to the method provided in this embodiment of this application, before or during the video call with the another device 500, the master device 100 can establish a communication connection with the slave device 200, and obtain an image of the slave device 200. In this way, the slave device 200 is equivalent to a remote camera of the master device 100, and the master device 100 may display the image of the slave device 200.

In addition, in the video call scenario, the master device 100 may further upload the displayed image, that is, the image of the slave device 200, to a video call server. Further, the server may send the image to the another device 500 that makes the video call with the master device 100. In this way, the another device 500 may also obtain, by making the video call with the master device 100, the image captured by the slave device 200.

FIG. 5A to FIG. 5D show examples of some user interfaces implemented on a master device 100 when the master device 100 establishes a communication connection with a slave device 200.

Figure 5A:
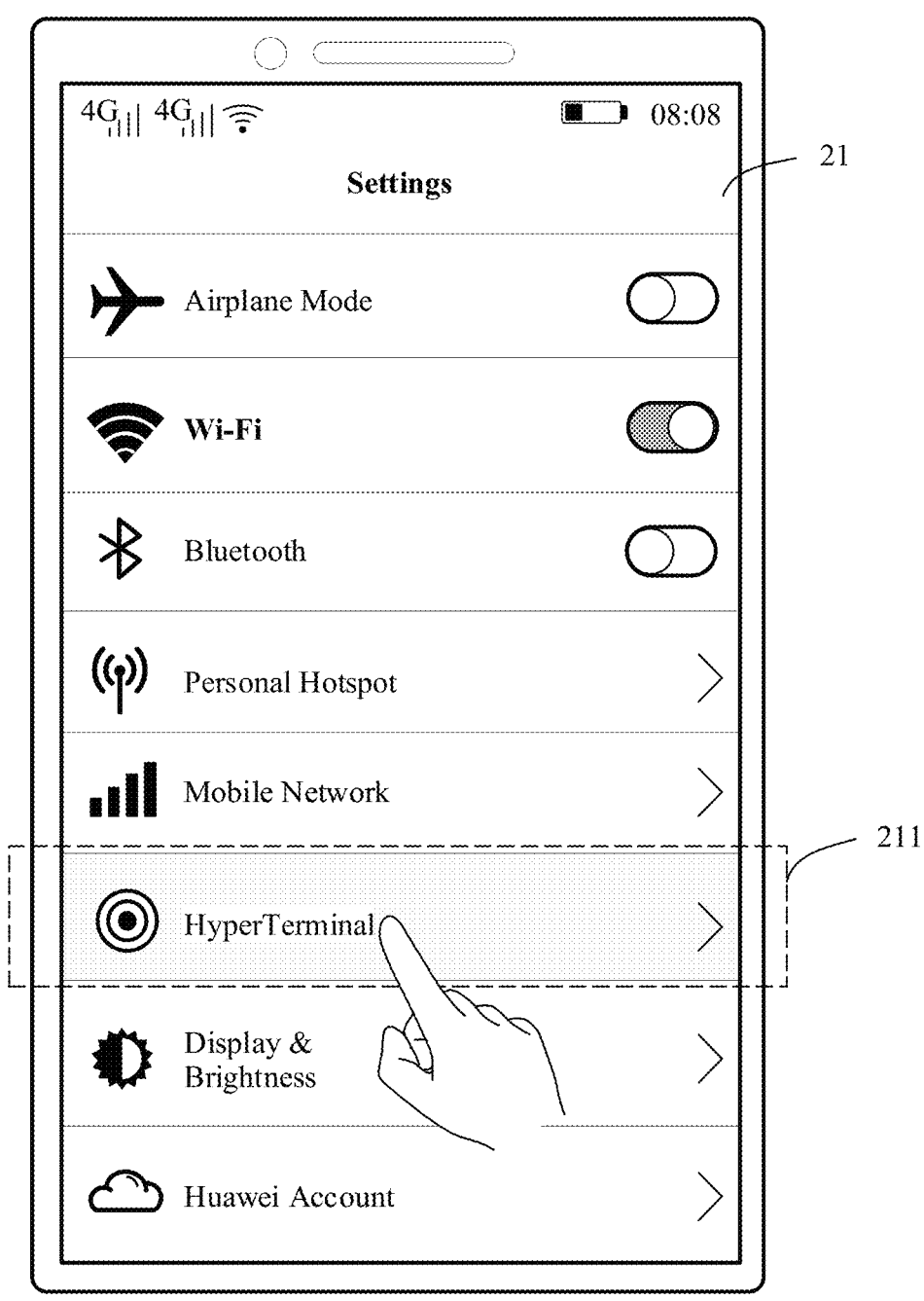

FIG. 5A shows an example of a default user interface 21 provided by a setting application after the master device 100 starts the setting application. The master device 100 may detect a touch operation performed by a user on different functional options in the user interface 21, and in response to the operation, the master device 100 may enable or disable a function like an airplane mode, Wi-Fi, Bluetooth, a hotspot, or a mobile network. The user interface 21 includes a "HyperTerminal" option 211. The "HyperTerminal" option 211 may be configured to trigger the master device 100 to enter the user interface shown in FIG. 5B. The interface receives an operation of a user, triggers the master device 100 to search for the slave device 200 and establish a communication connection with the slave device 200, and then obtains and displays an image captured by the slave device 200.

As shown in FIG. 5A, when the master device 100 detects a touch operation performed by the user on the "HyperTerminal" option 211, the master device 100 displays a user interface 31 in response to the operation.

Figure 5B:
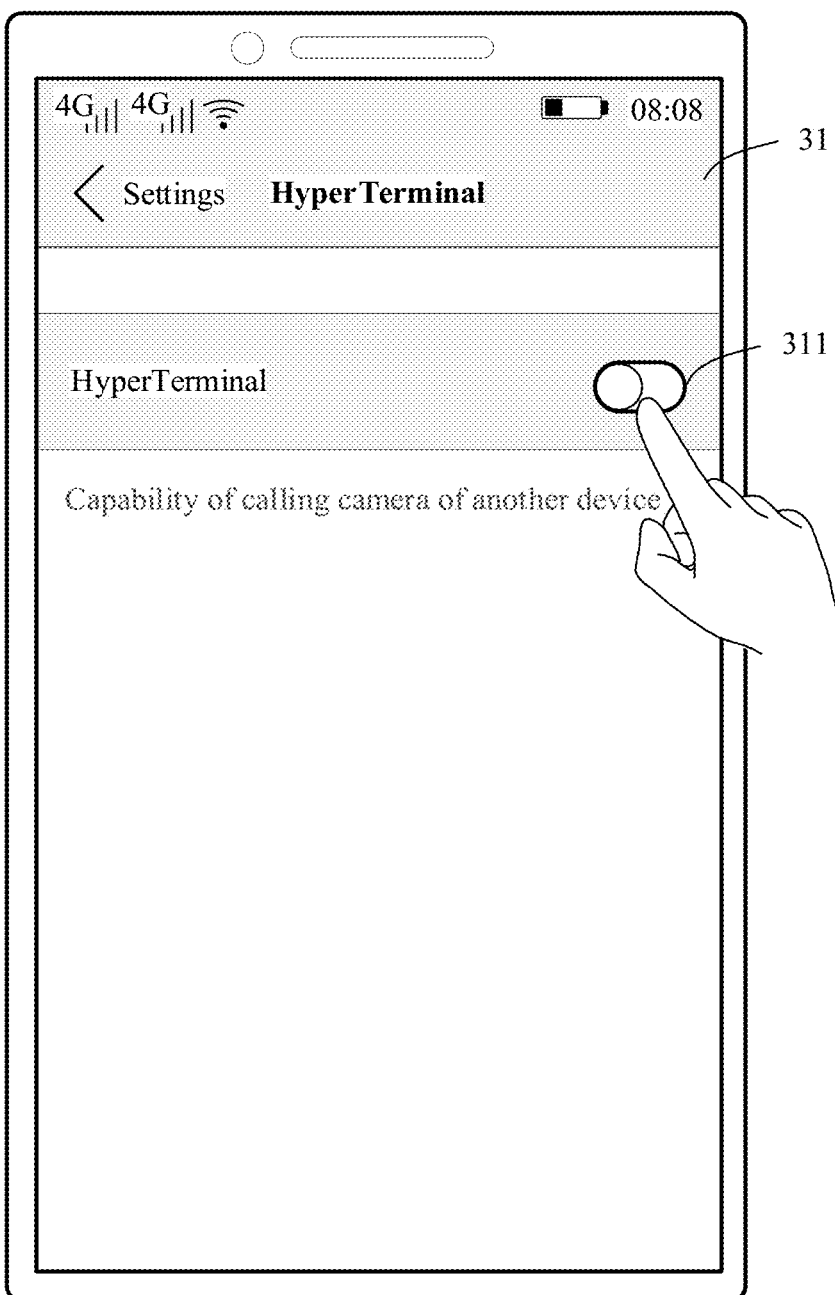

As shown in FIG. 5B, the user interface 31 includes a switch control 311. The switch control 311 may be configured to enable or disable a camera switching function of the master device 100. When the master device 100 detects a touch operation performed by the user on the switch control 311, in response to the operation, the master device 100 may discover another nearby electronic device by using the foregoing short-distance communication technology like Bluetooth, Wi-Fi, or NFC, or may discover another remote electronic device by using the foregoing long-distance communication technology. The master device 100 newly displays, on the user interface 31, a plurality of device options shown in FIG. 5C, and the plurality of device options respectively correspond to devices found by the master device 100 by using the short-distance communication technology or the long-distance communication technology.

Figure 5C:
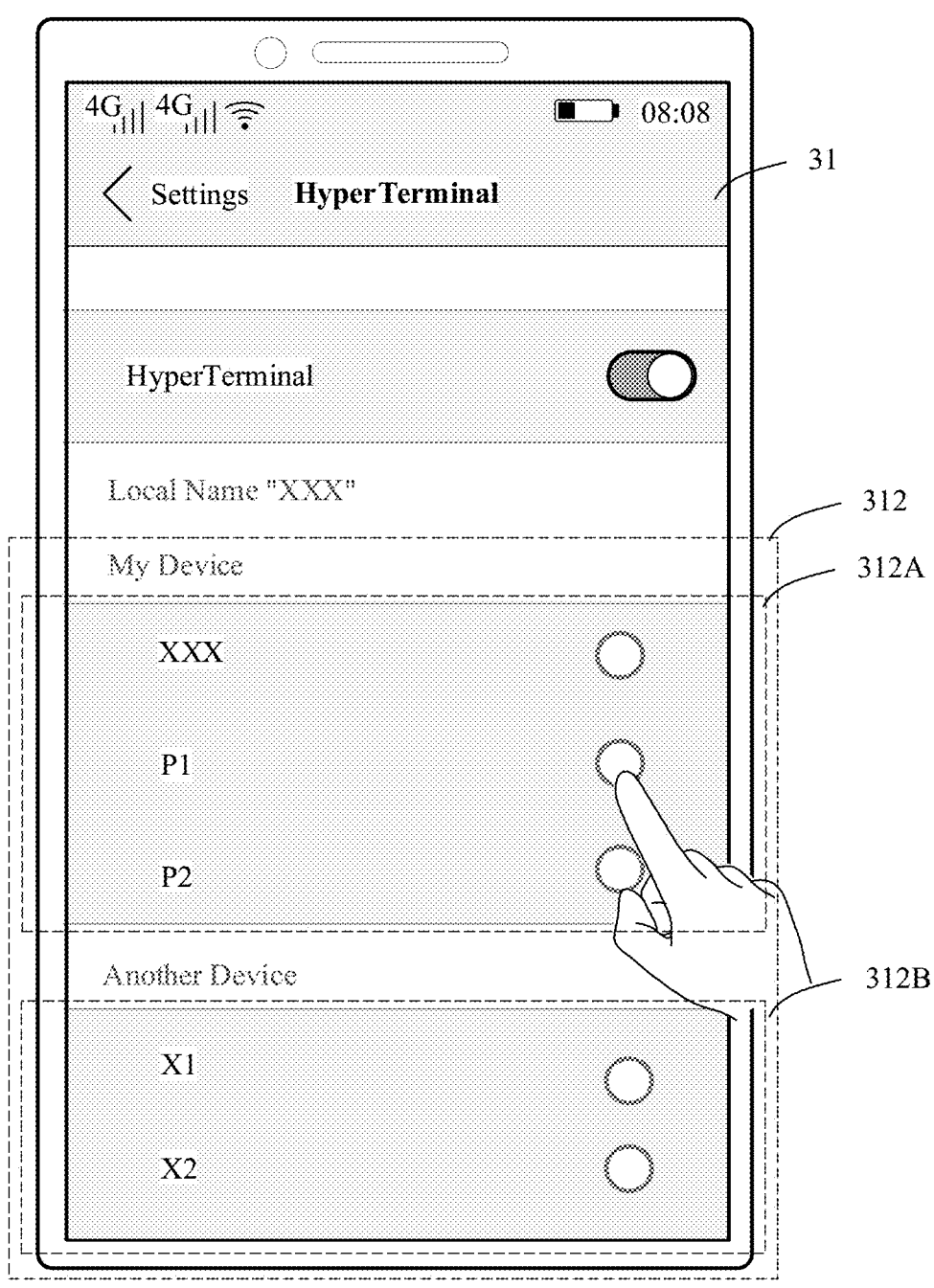

As shown in FIG. 5C, the user interface 31 further includes a device selection region 312. The device selection region 312 is for displaying device options corresponding to a plurality of devices found by the master device 100. The device selection region 312 may include a first selection region 312A and a second selection region 312B. The first selection region 312A is for displaying a trusted device that can establish a communication connection with the master device 100. The trusted device may refer to a device that has established the communication connection with the master device 100, a device that logs in to a same system account as the master device 100, a device with a system account belonging to a same account group as a system account of the master device 100, or the like. The second selection region 312B is for displaying an untrusted device that can establish a communication connection with the master device 100. The untrusted device may be a device that has not established the communication connection with the master device 100, or a device that has logged in to a different system account from the master device 100.

As shown in FIG. 5C, when the master device 100 may receive a selection operation performed by the user on a "P1" device in the first selection region 312A, the master device 100 initiates, to the slave device 200, a request for establishing a communication connection. "P1" may be a device name of the slave device 200, a system account name, or the like.

As shown in FIG. 5D, after the master device 100 receives feedback information indicating that the slave device 200 allows establishment of the communication connection, the master device 100 completes the establishment of the communication connection with the slave device 200, and displays a connection flag 313. The connection flag 313 indicates that the master device 100 establishes the communication connection with the slave device 200.

Figure 6A:
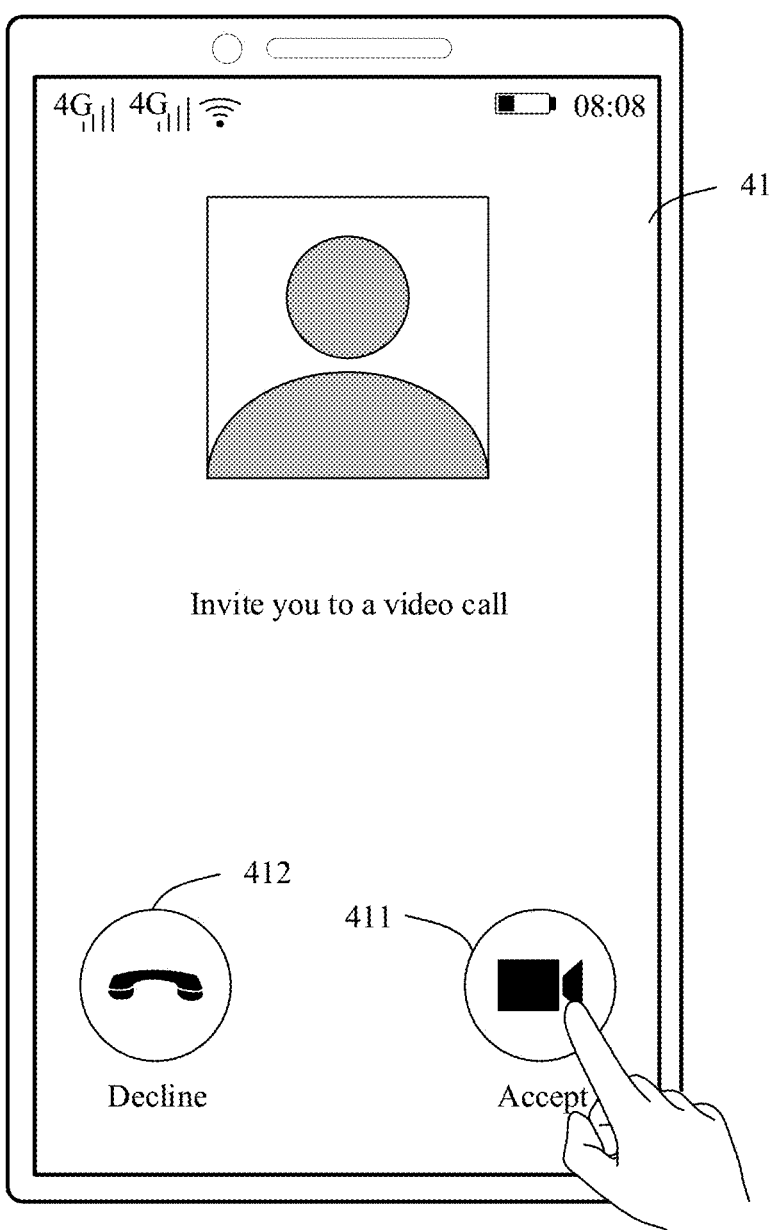
Figure 6B:
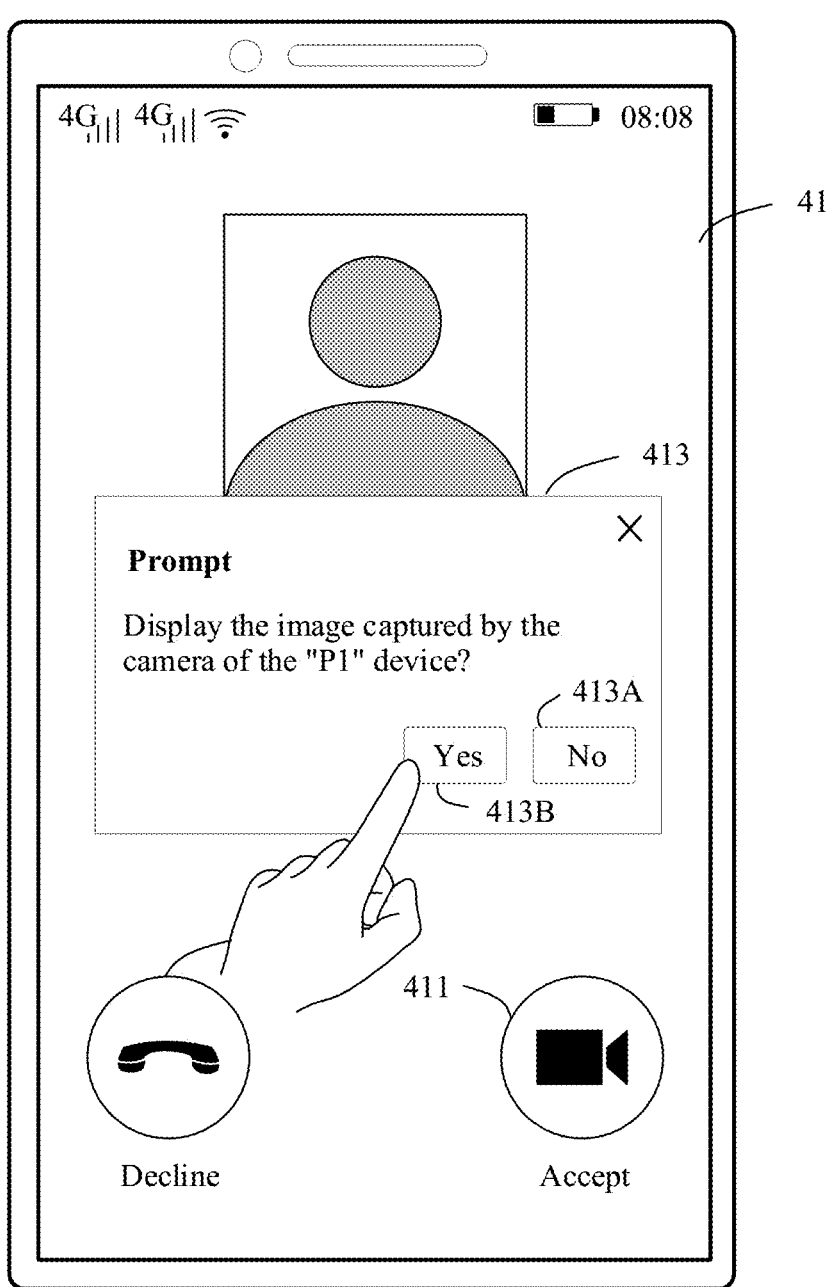
Figure 6C:
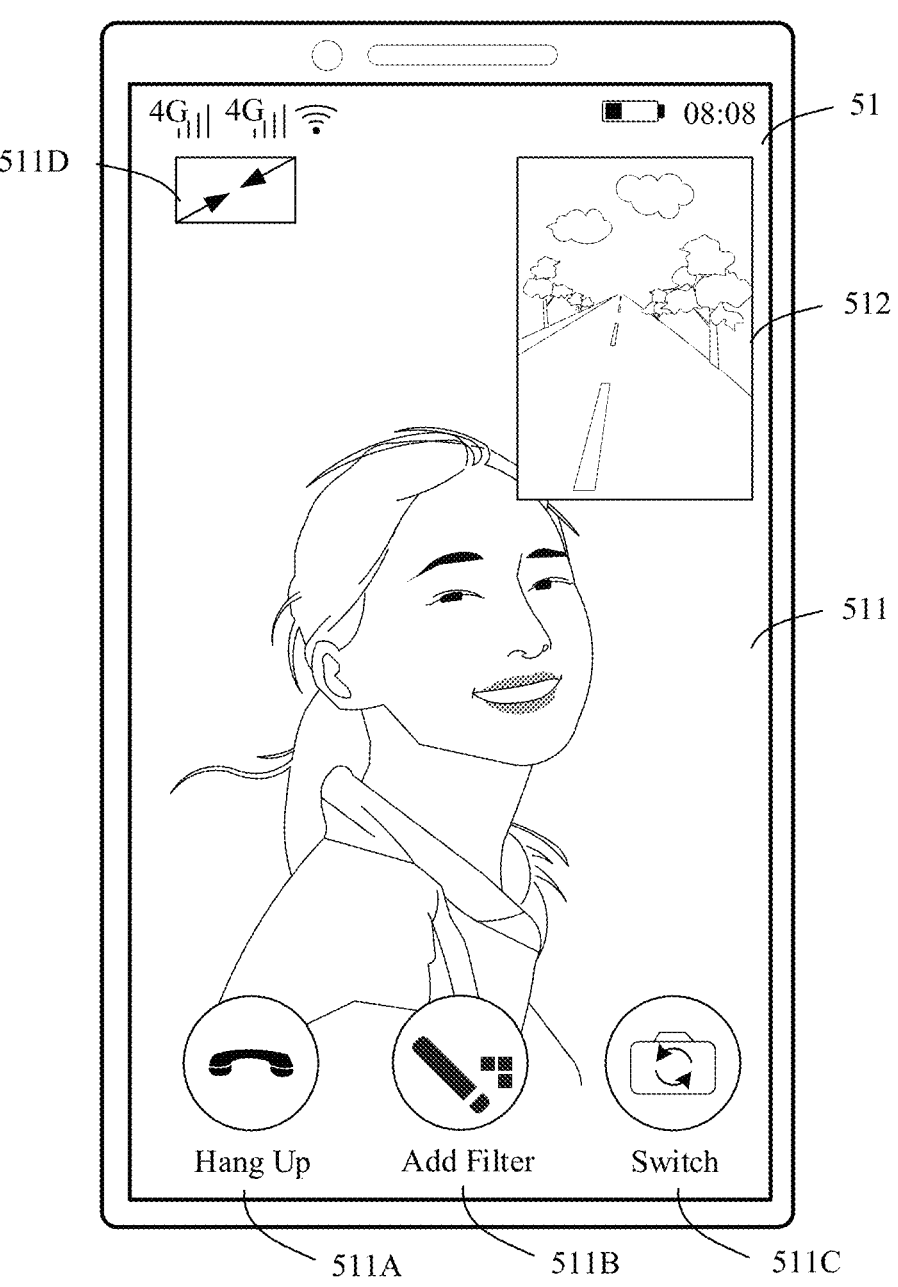

FIG. 6A to FIG. 6C show examples of some user interfaces implemented on the master device 100 when the master device 100 enters a video call scenario after the master device 100 completes the establishment of the communication connection with the slave device 200.

FIG. 6A shows an example of a user interface 41 displayed by the master device 100 when the master device 100 answers a video call made by another device 500.

As shown in FIG. 6A, the user interface 41 may include an answer control 411 and a decline control 412. The answer control 411 may be configured to monitor a user operation that triggers an answer of a video call. The master device 100 may detect a user operation performed on the answer control 411, and in response to the operation, the master device 100 may display a prompt box 413 shown in FIG. 6B. The prompt box 413 is configured to prompt the user whether to obtain and display an image captured by the slave device 200. The decline control 412 may be configured to monitor a user operation that triggers declining a video call. The master device 100 may detect a user operation performed on the answer control 411, and in response to the operation, the master device 100 exits the user interface 41, and displays a previous user interface or a default main interface of the master device 100.

As shown in FIG. 6B, the prompt box 413 includes a cancel control 413A and a confirm control 413B. When the master device 100 detects a touch operation performed by the user on the cancel control 413A, the master device 100 does not obtain, in response to the operation, the image captured by the slave device 200. When the master device 100 detects a touch operation performed by the user on the confirm control 413B, in response to the operation, the master device 100 sends, to the slave device 200, a request for obtaining the image captured by the slave device 200, and then obtains the image captured by the slave device 200. In addition, regardless of whether the master device 100 detects a touch operation performed by the user on the cancel control 413A or the confirm control 413B, the master device 100 enters a user interface 51 shown in FIG. 6C.

As shown in FIG. 6C, the user interface 51 may include a parent preview box 511 and a child preview box 512. By default, the parent preview box 511 is configured to display the image C captured by the another device 500, and the child preview box 512 is configured to display the image A captured by the master device 100 or the image B captured by the slave device 200. With reference to the prompt box 413 shown in FIG. 6B, when the master device 100 detects the touch operation performed by the user on the cancel control 413A, the child preview box 512 displays the image A captured by the master device 100. When the master device 100 detects the touch operation performed by the user on the confirm control 413B, after the image captured by the slave device 200 is received, the child preview box 512 displays the image B captured by the slave device 200.

A region in which the parent preview box 511 is located further includes a hang-up control 511A, a filter adding control 511B, a switching control 511C, and a preview box conversion control 511D.

The hang-up control 511A may be configured to monitor a user operation that triggers hang-up of a video call, and in response to the operation, the master device 100 ends the video call.

The filter adding control 511B may be configured to monitor a user operation that triggers filter adding, and in response to the operation, the master device 100 adds a filter to the image captured by the local end or the image obtained from the slave device 200.

The switching control 511C may be configured to monitor a user operation that triggers camera switching, and in response to the operation, the master device 100 switches a camera for capturing an image. For example, when the master device 100 enters the user interface 51, a front-facing camera of the master device 100 is used by default to capture an image, and when the master device 100 detects a user operation (for example, a tap operation) performed by the user on the switching control 511C, the master device 100 switches to a rear-facing camera to capture an image.

The preview box conversion control 511D may be configured to monitor and trigger conversion of images displayed in the parent preview box 511 and the child preview box 512. When an image displayed in the child preview box 512 is the image B captured by the slave device 200, after the master device 100 detects a user operation (for example, a tap operation) performed by the user on the preview box conversion control 511D, in response to the operation, the image C captured by the another device 500 and displayed by default in the parent preview box 511 is updated to the image B captured by the slave device 200, and the image B captured by the slave device 200 and displayed by default in the child preview box 512 is updated to the image C captured by the another device 500. When an image displayed in the child preview box 512 is the image A captured by the master device 100, after the master device 100 detects a user operation (for example, a tap operation) performed by the user on the preview box conversion control 511D, in response to the operation, the image C captured by the another device 500 and displayed by default in the parent preview box 511 is updated to the image A captured by the master device 100, and the image A captured by the master device 100 and displayed by default in the child preview box 512 is updated to the image C captured by the another device 500. The master device 100 may further detect again a user operation performed by the user on the preview box conversion control 511D, and in response to the operation, the master device 100 converts, in the same manner, the images displayed in the parent preview box 511 and the child preview box 512.

It can be seen from FIG. 6B and FIG. 6C that when the master device 100 detects that the user determines to display the image captured by the slave device 200, the user interface 51 does not display the image captured by the master device 100, but displays the image B captured by the slave device 200 and the image C captured by the another device 500 through the video call. In addition, when the master device 100 detects a touch operation performed by the user on the hang-up control 511A, the master device 100 no longer obtains the image of the slave device 200 in response to the operation. When the master device 100 detects a touch operation performed by the user on the filter adding control 511B, in response to the operation, the master device 100 changes display effect of the image of the slave device 200, and adds a filter to the image of the slave device 200, or sends, to the slave device 200, an instruction for adding a filter, to enable the slave device 200 to add the filter. The slave device 200 returns, to the master device 100, an image with the filter added. When the master device 100 detects a touch operation performed by the user on the preview box conversion control 511D, an image to which the master device 100 switches is the image C captured by the another device 500 and the image of the slave device 200.

It may be understood that the master device 100 may skip the prompt step shown in FIG. 6B. To be specific, in a case that the master device 100 has established the communication connection with the slave device 200, when the master device 100 detects a user operation of enabling a camera function by the user, the master device 100 directly initiates a request for obtaining the image captured by the slave device 200 to the slave device 200, without displaying prompt information to prompt the user whether to obtain the image captured by the slave device 200.

Figure 7A:
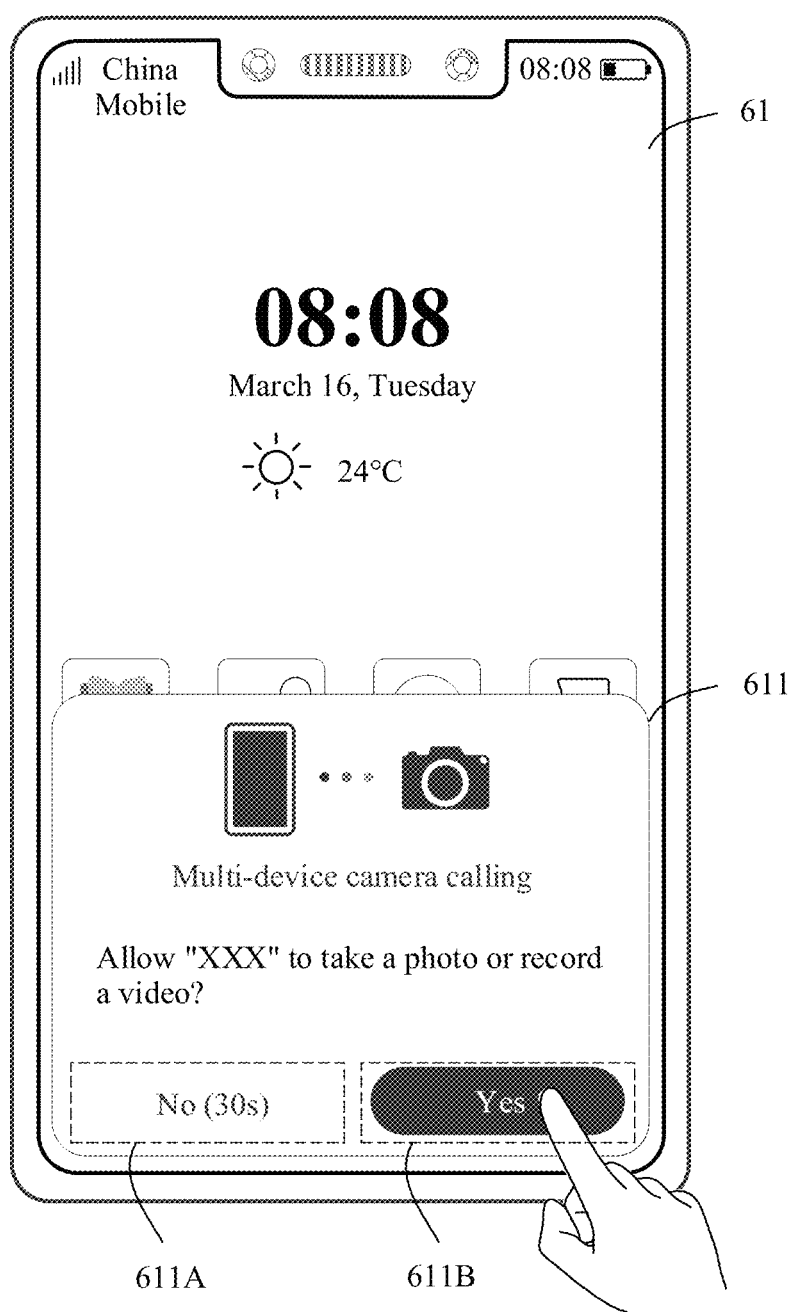
Figure 7B:
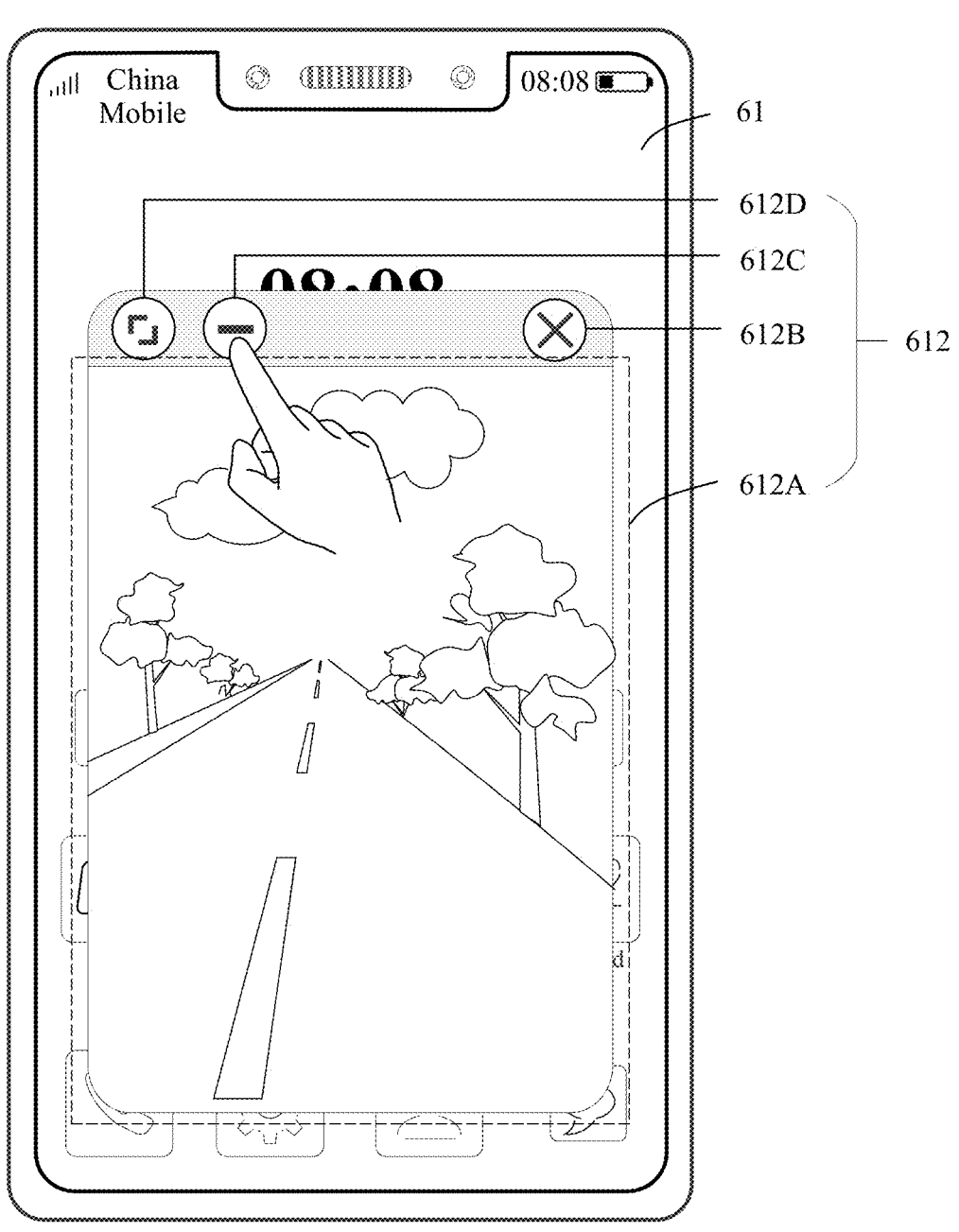
Figure 7C:

FIG. 7A to FIG. 7C show examples of some user interfaces implemented on the slave device 200 after the master device 100 completes the establishment of the communication connection with the slave device 200.

After the master device 100 completes the establishment of the communication connection with the slave device 200, when the master device 100 detects a user operation of enabling a camera function by the user, or further, when the master device 100 detects a user operation that the user determines to obtain the image captured by the slave device 200, the master device 100 sends, to the slave device 200, a request for obtaining the image captured by the slave device 200. In a user interface 61 shown in FIG. 7A, when the slave device 100 receives a request that is sent by the master device 100 and that is for obtaining the image captured by the slave device 200, a first prompt box 611 is floated on the user interface 61. The first prompt box 611 is configured to display prompt information that the master device 100 requests to obtain the image captured by the slave device 200.

As shown in FIG. 7A, the first prompt box 611 includes a "forbid" control 611A and an "allow" control 611B. The "forbid" control 611A may be configured to reject the request that is sent by the master device 100 and that is for obtaining the image captured by the slave device 200. When the slave device 200 detects a touch operation performed by the user on the "forbid" control 611A, the slave device 200 closes the first prompt box 611 in response to the operation, so that the master device 100 cannot obtain the image captured by the slave device 200. The "allow" control 611B may be configured to receive the request that is sent by the master device 100 and that is for obtaining the image captured by the slave device 200. When the slave device 200 detects a touch operation performed by the user on the "allow" control 611B, the slave device 200 obtains, in response to the operation, the image captured by the camera, the first prompt box 611 is updated to an image preview window 612 shown in FIG. 7B, and the slave device 200 sends the captured image to the master device 100.

As shown in FIG. 7B, the image preview box 612 includes an image preview region 612A, a close control 612B, a minimization control 612C, and a zoom control 612D. The image preview region 612A is for displaying the image captured by the camera of the slave device 200, and the close control 612B is configured to end a current camera switching process of the master and slave devices. When the slave device 200 detects a touch operation performed by the user on the close control 612B, the slave device 200 stops sending the image of the slave device 200 to the master device 100 in response to the operation. The minimization control 612C is configured to minimize the image preview window 612. When the slave device 200 detects a touch operation performed by the user on the minimization control 612C, the image preview window 612 is scaled down to an image thumbnail window 613 shown in FIG. 7C in response to the operation. The zoom control 612D may be configured to zoom in on the image displayed in the image preview region 612A, to enter a user interface provided by a camera application.

As shown in FIG. 7C, the image thumbnail window 613 is floated above the user interface 61, and is configured to display the image captured by the slave device 200. The image thumbnail window 613 is always located at the forefront of content displayed on the display screen of the slave device 100. In addition, a position and a size of the image preview window 613 do not change with a swiping operation performed by the user on another region other than the region in which the image preview window 613 is located. In this way, the slave device 200 can always display an image capture status when the camera of the slave device 200 is called by the master device 100, and use of the slave device 200 by the user is not affected.

FIG. 8A to FIG. 8G show examples of some user interfaces involved when the master device 100 establishes the communication connection with the slave device 200 after entering the video call scenario.

Figure 8A:
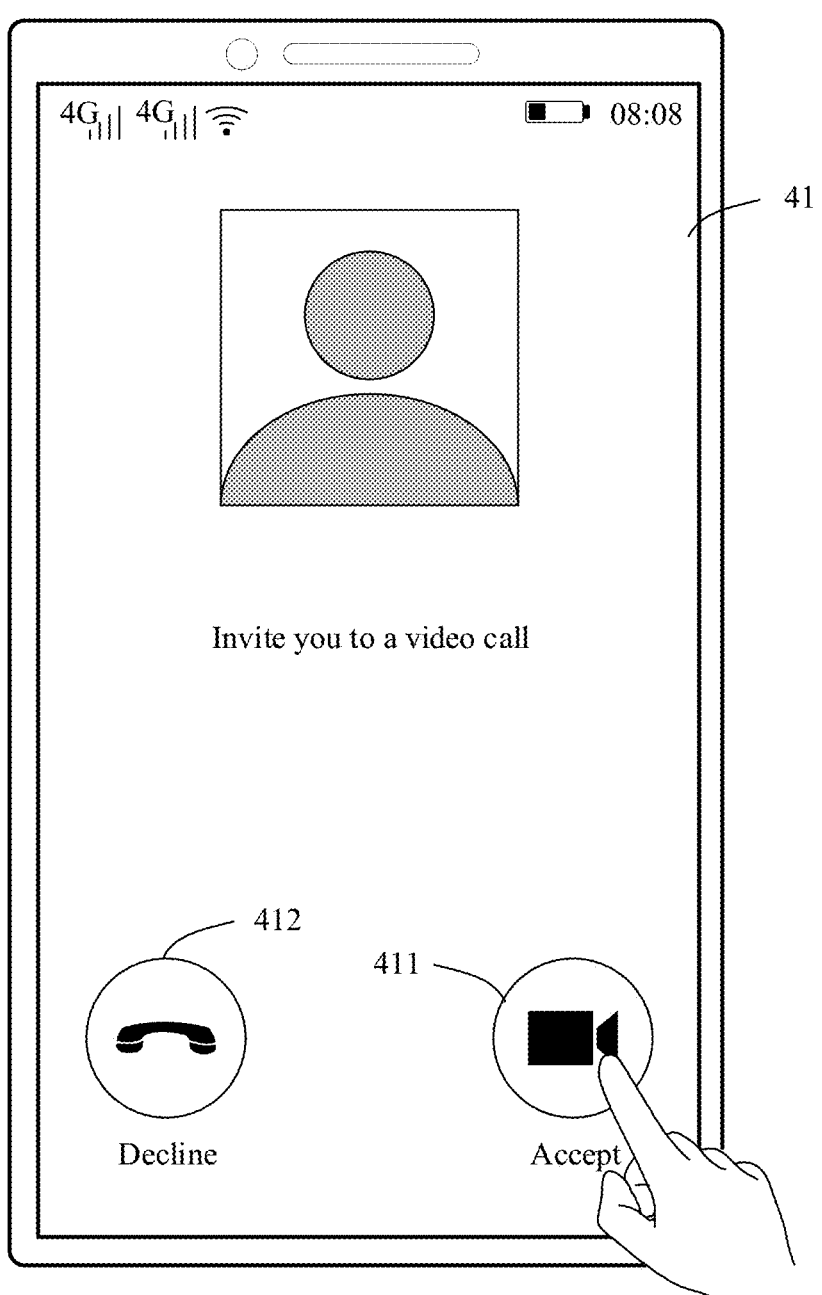

FIG. 8A shows an example of a user interface 41 displayed by the master device 100 when the master device 100 answers a video call made by another device 500. As shown in FIG. 8A, the master device 100 detects a touch operation performed by the user on the answer control 411, and in response to the operation, the master device 100 displays a user interface shown in FIG. 8B, and displays the image captured by the camera of the master device 100 and the image that is sent by the another device 500 to the master device 100 by using a video call server.

Figure 8B:

FIG. 8B shows an example of a user interface 51 displayed by the master device 100 when the master device 100 makes the video call with the another device 500. The parent preview box 511 displays the image C captured by the another device 500, and the child preview box 512 displays the image A captured by the master device 100. For specific descriptions of the user interface 51, refer to related descriptions in FIG. 6C.

Figure 8C:
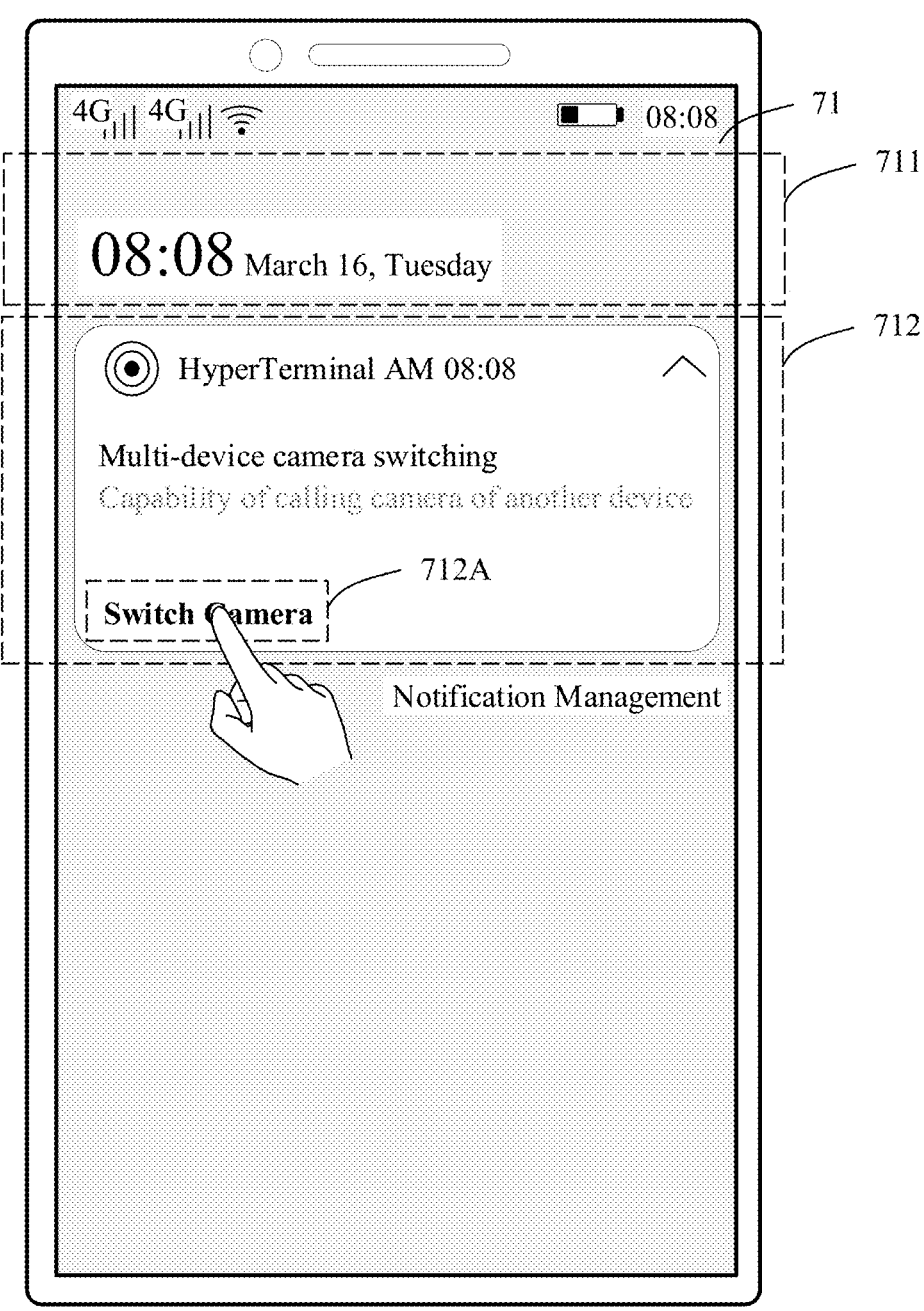

As shown in FIG. 8B, the master device 100 may detect a user operation of, for example, swiping down, and in response to the operation, the master device 100 displays a user interface 71 shown in FIG. 8C.

As shown in FIG. 8C, the user interface 71 may include: a time bar 711 and a device switching notification bar 712.

The time bar 711 may be configured to display time. The device switching notification bar 712 may be configured to display system notification information. Specifically, when the master device 100 detects that the user enables a video call function, the master device 100 may display the camera switching notification bar 712 in a system notification bar. The camera switching notification bar 712 is configured to prompt the user that the image displayed by the master device 100 may be replaced with an image captured by another electronic device. In addition, the camera switching notification bar 712 may be configured to monitor and trigger searching for another electronic device with a camera, to further implement the establishment of the communication connection between the master device 100 and the slave device 200. The camera switching notification bar 712 includes a "switch camera" option 712A, and the "switch camera" option 712A may be configured to search for the slave device 200. When the master device 100 detects a touch operation performed by the user on the "switch camera" option 712A, in response to the operation, the master device 100 returns to a previous user interface, that is, the user interface 51, and displays, in a floating manner, a device selection window 513 shown in FIG. 8D. The device selection window 513 may be configured to display another electronic device found by the master device 100 by using the short-distance communication technology or the long-distance communication technology. When the device selection window 513 receives a selection operation performed by the user on a device in the window, the master device 100 establishes a communication connection with the device.

Figure 8D:
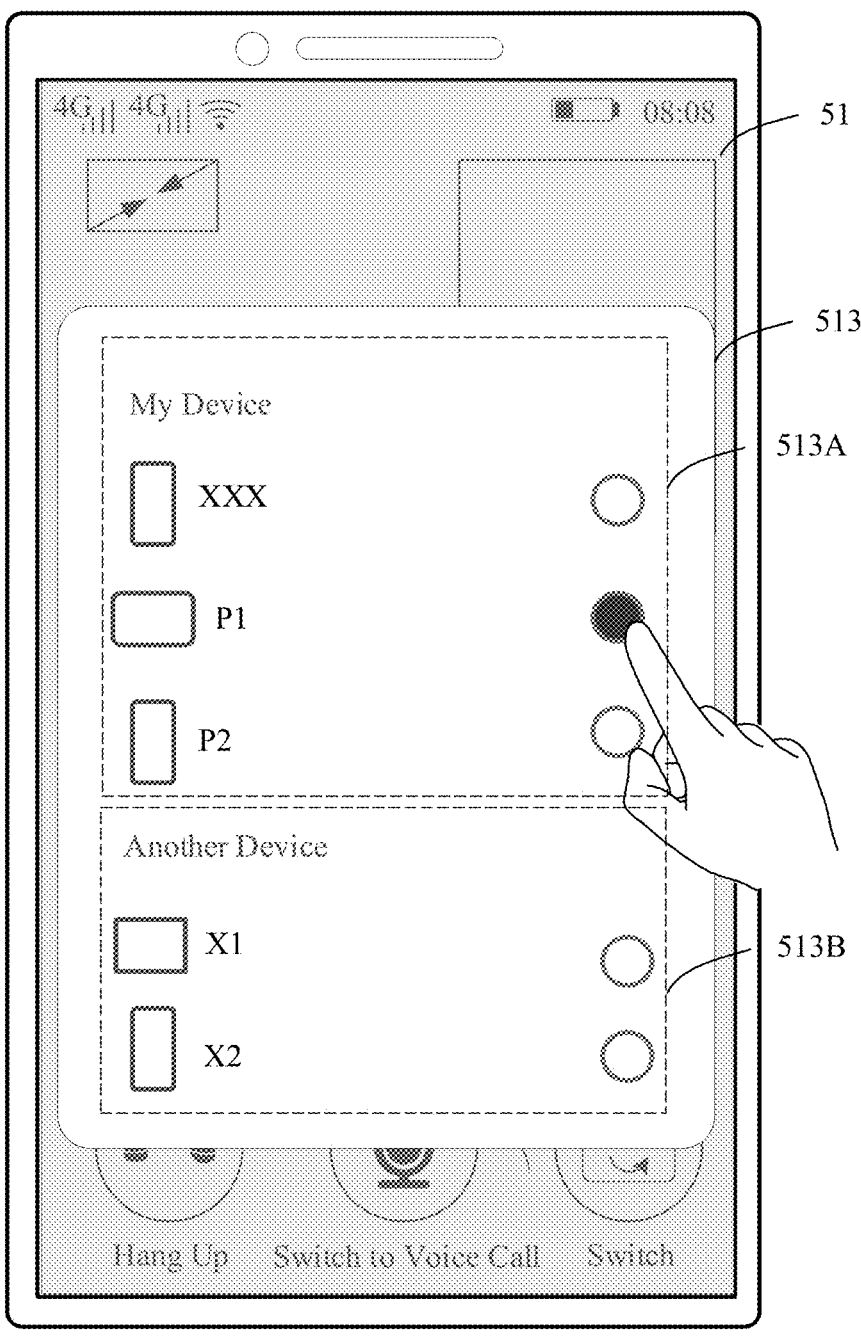

As shown in FIG. 8D, the selection window 513 may include a first selection region 513A and a second selection region 513B. The first selection region 513A is for displaying a trusted device that can establish a communication connection with the master device 100. The second selection region 513B is for displaying an untrusted device that can establish a communication connection with the master device 100. For specific descriptions of the trusted device and the untrusted device, refer to related descriptions in FIG. 5C.

When the master device 100 receives a selection operation performed by the user on a "P1" device in the first selection region 513A, where "P1" may be a device name of the slave device 200, a system account name, or the like, the master device 100 initiates, to the slave device 200, a request for establishing a communication connection. After receiving feedback information indicating that the slave device 200 allows establishment of the communication connection, or further, after receiving feedback information indicating that the slave device 200 allows obtaining the image captured by the slave device 200, the master device 100 obtains the image captured by the camera of the slave device 200, and displays a user interface 51 shown in FIG. 8E.

Figure 8E:
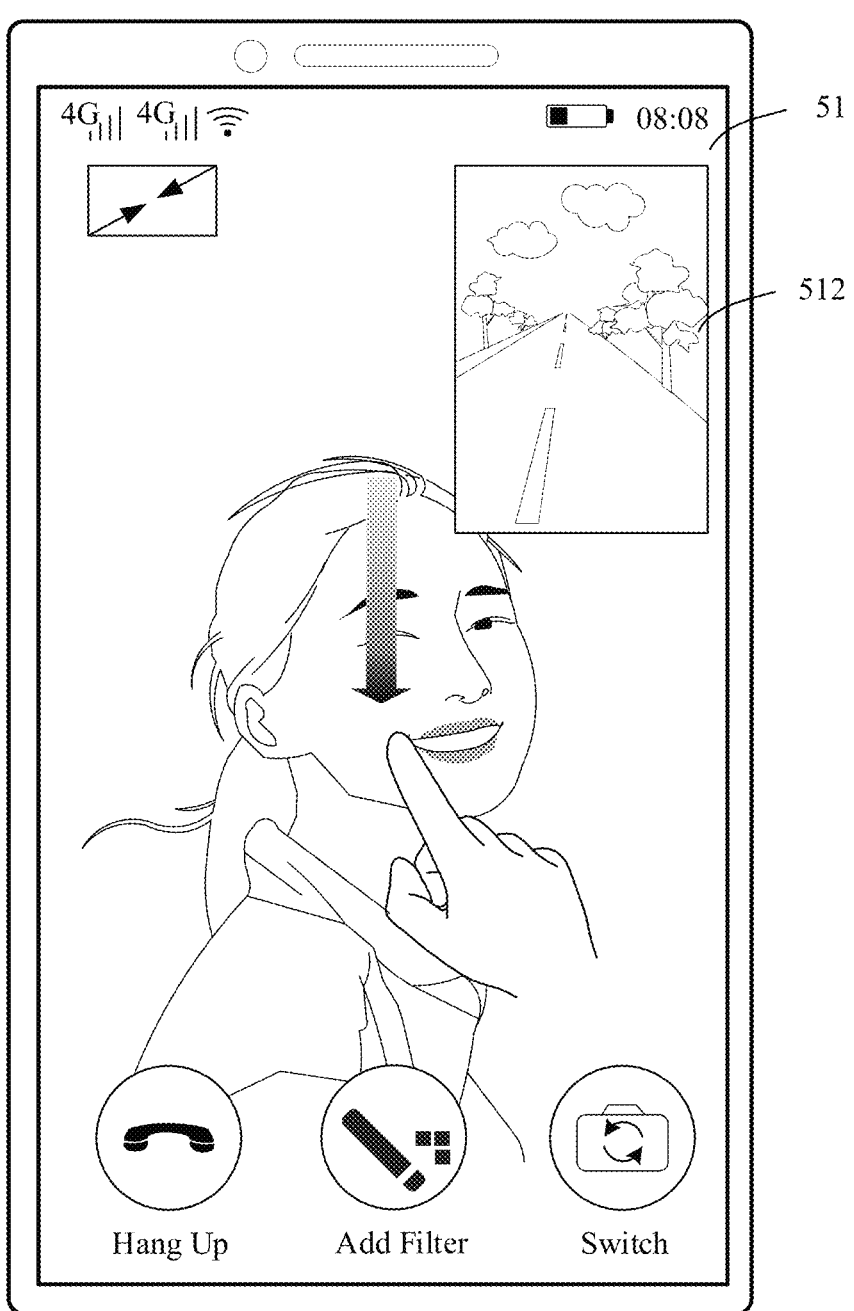

As shown in FIG. 8E, the child preview box 512 is configured to display replacement from the image captured by the master device 100 to the image captured by the slave device 200. The master device 100 receives an operation of, for example, swiping down by the user, and displays a user interface 71 shown in FIG. 8E.

Figure 8F:
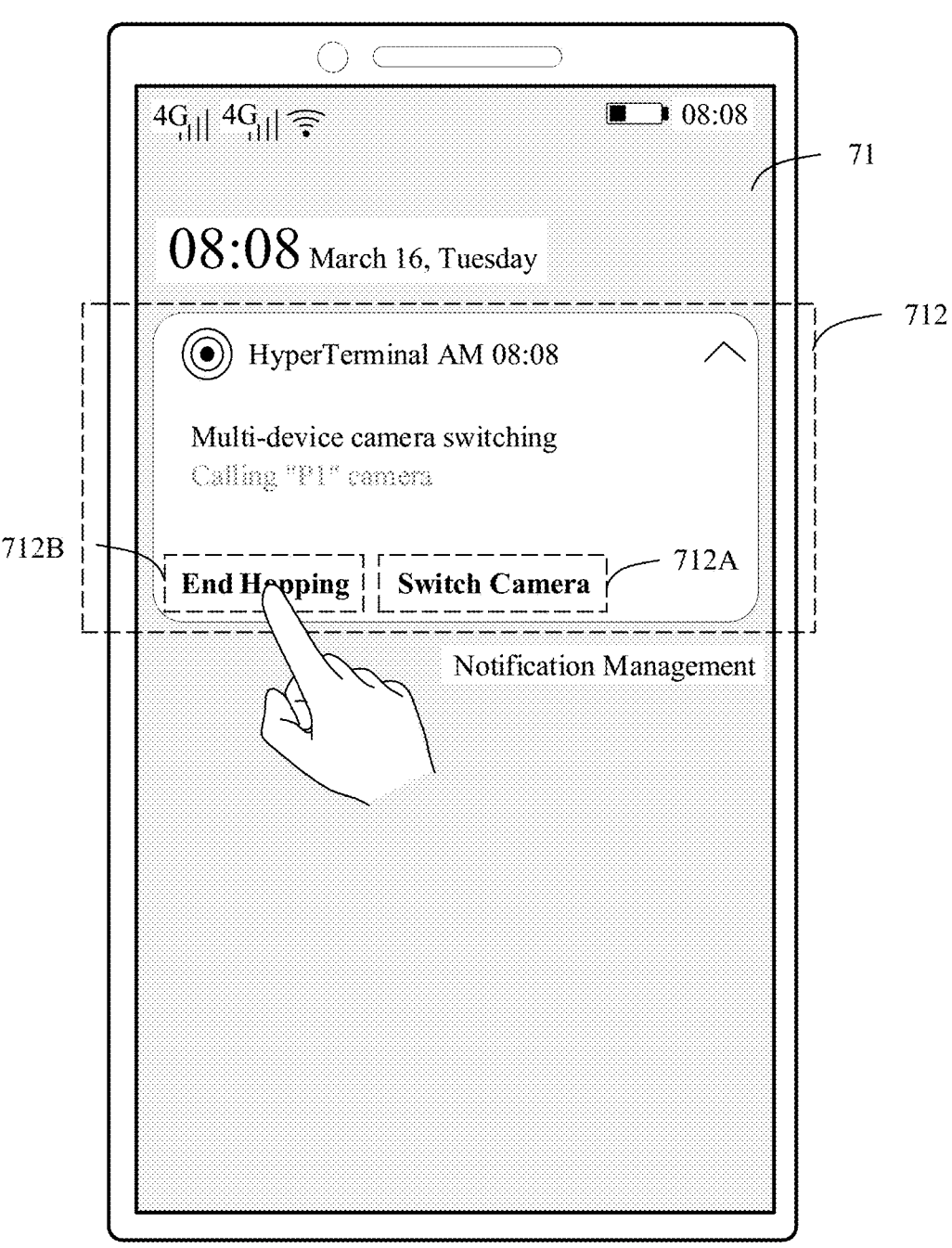
Figure 8G:

As shown in FIG. 8F, when the master device 100 has established the communication connection with the slave device 200, the device switching notification bar 712 in the user interface 71 displays a connection status of the master device 100, indicating that the master device 100 is calling the camera of the slave device 200. In this case, the device switching notification bar 712 further includes an "end hopping" control 712B. The "end hopping" control 712B may be configured to end the communication connection between the master device 100 and the slave device 200. When the master device 100 receives a touch operation performed by the user on the "end hopping" control 712B, in response to the operation, the master device 100 displays a user interface 51 shown in FIG. 8G, no longer obtains the image captured by the slave device 200, and replaces the image B that is captured by the slave device 200 and that is displayed on a video call interface with the image A captured by the master device 100.

It may be understood that the foregoing manner of triggering, by using the notification bar, the process of establishing the communication connection between the master device 100 and the slave device 200 is not limited. In this embodiment of this application, the master device 200 may further enable, by using a floating control, the process of establishing the communication connection between the master device 100 and the slave device 200. Specifically, when the master device 100 detects a user operation of enabling a video call function, the master device 100 displays a floating control. When the master device 100 detects a touch operation performed by the user on the floating control, the master device 100 displays a plurality of found electronic devices with a camera. When the master device 100 detects a selection operation performed by the user on a device, the master device 100 establishes a communication connection with the device. In addition, this is not limited to the user operation of enabling the video call function by the master device 100. In this embodiment of this application, when the master device 100 detects a user operation of enabling a photo shooting function, a code scanning function, a photographing translation function, a live streaming function, or the like, the master device 100 may provide an icon or a control, for example, the camera switching notification bar 712 or the floating control, for the user to trigger the process of establishing the communication connection between the master device 100 and the slave device 200.

It can be learned from FIG. 5A to FIG. 5D, FIG. 6A to FIG. 6C, FIG. 7A to FIG. 7C, and FIG. 8A to FIG. 8G that, in a case that the slave device 200 is a trusted device of the master device 100, when the master device 100 sends, to the slave device 200, a request for establishing a communication connection, an account identity of the slave device 200 may not need to be verified. The slave device 200 may directly send, to the master device 100, feedback information indicating that the communication connection is allowed to be established, to complete the process of establishing the communication connection between the master device 100 and the slave device 200.

Then, in a case that the slave device 200 is an untrusted device of the master device 100, when the master device 100 sends, to the slave device 200, a request for establishing a communication connection, an authentication process may be further included. To be specific, the master device 100 can complete the process of establishing the communication connection with the slave device 200 only after the master device 100 and the slave device 200 complete the authentication process. The authentication process can verify an account identity of the slave device 200, ensuring security of a camera switching process.

Figure 9A:
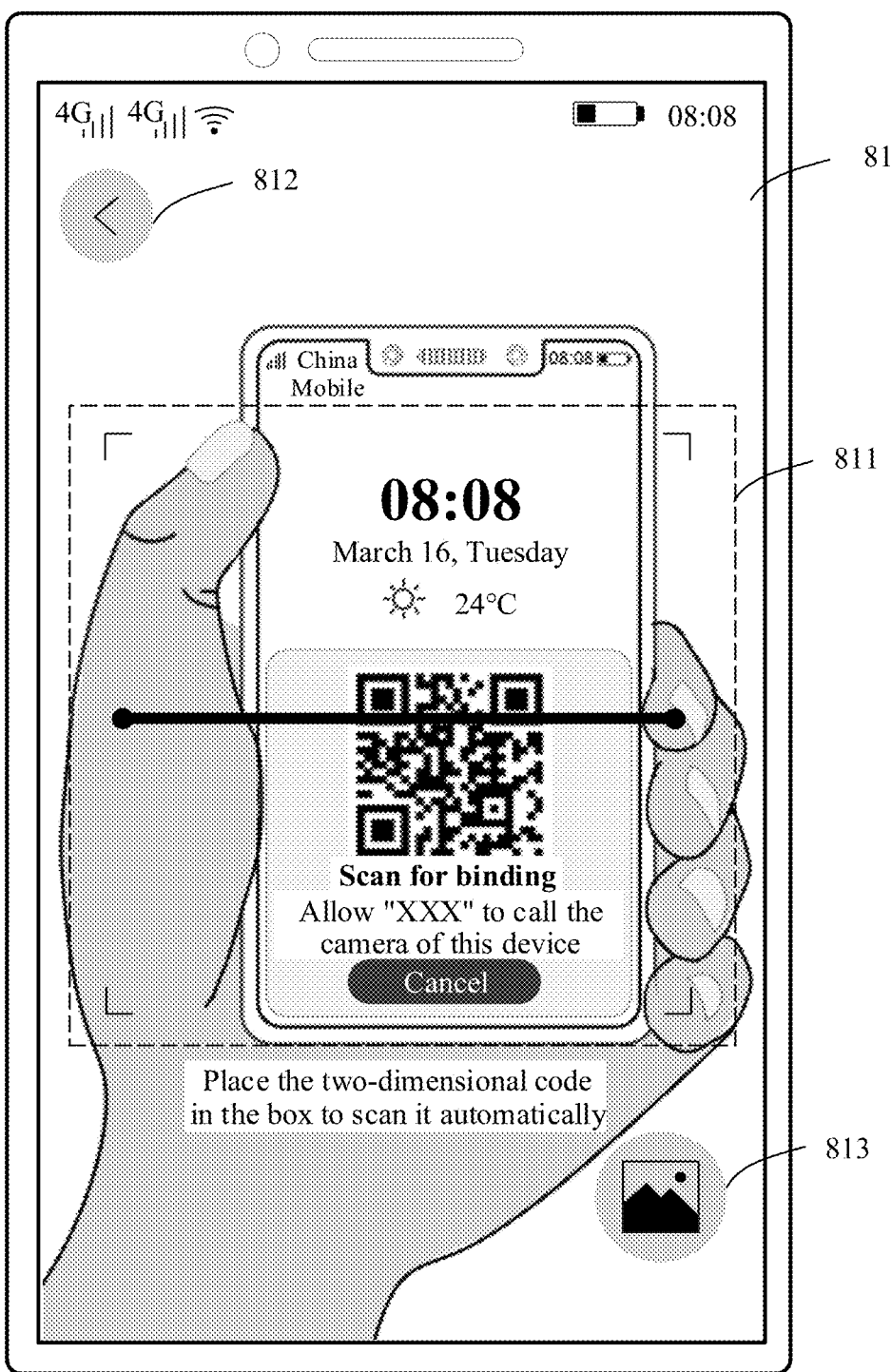
Figure 9B:
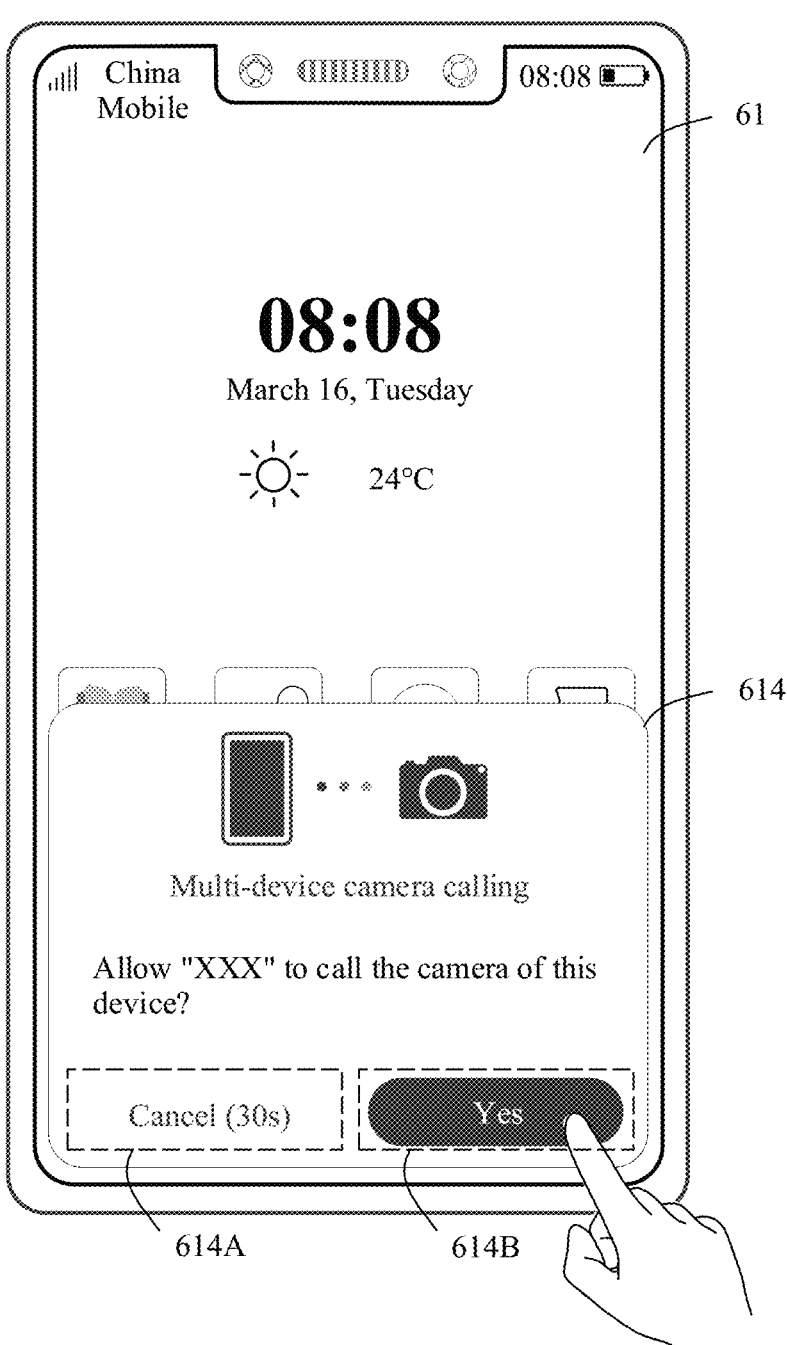
Figure 9C:

FIG. 9A to FIG. 9C show examples of some user interfaces involved in an authentication process of the master device 100 and the slave device 200.

When the master device 100 detects that the user triggers a user operation of searching for another camera, for example, the user operation performed on the switch control 311 shown in FIG. 5B or the user operation performed on the "switch camera" option 712A shown in FIG. 8C, the master device 100 displays a plurality of found device options. When the master device 100 detects a selection operation performed by the user on a device in the second selection region 312B shown in FIG. 5C or a device in the second selection region 513B shown in FIG. 8D, the master device 100 sends, to the selected device (using the slave device 200 as an example below), a request for establishing a communication connection, enters an authentication process, turns on a camera, and displays a user interface 81 shown in FIG. 9A.

As shown in FIG. 9A, the user interface 81 may be configured to display an image captured by the camera of the master device 100, and obtain account information of the slave device 200 from the image, to complete the authentication process, to complete a temporary trusted connection. The user interface 81 includes a two-dimensional code recognition region 811, a return control 812, and a photos control 813. The two-dimensional code recognition region 811 is for recognizing a two-dimensional code. In the image captured by the master device 100, when the two-dimensional code is located in the two-dimensional code recognition region 811, the master device 100 may obtain the account information of the slave device 200 from the two-dimensional code. The return control 812 is configured to exit the current code scanning authentication process. The photos control 813 may be configured to select a two-dimensional code picture from photos of the master device 100 to implement two-dimensional code scanning.

After the master device 100 selects the slave device 200 as a device for camera switching, for example, after FIG. 5C or FIG. 8D, when the slave device 200 receives a request for establishing a communication connection sent by the master device 100, the slave device 200 displays a user interface 61 shown in FIG. 9B.

As shown in FIG. 9B, a second prompt box 614 is floated on the user interface 61. The second prompt box 614 is configured to prompt the user whether to agree to the authentication process. The second prompt box 614 includes a "cancel" control 614A and an "allow" control 614B. The "cancel" control 614A is configured to reject the authentication process. When the slave device 200 detects a touch operation performed by the user on the "cancel" control 614A, in response to the operation, the slave device 200 refuses to establish the communication connection with the master device 100, and closes the second prompt box 614. The "allow" control 614B is configured to receive the authentication process. When the slave device 200 detects a touch operation performed by the user on the "allow" control 614B, the slave device 200 updates the second prompt box 614 to a third prompt box 615 shown in FIG. 9C in response to the operation. The third prompt box 615 is configured to display a two-dimensional code that includes the account information of the slave device 200.

As shown in FIG. 9C, the third prompt box 615 may include a "cancel" control 615A and an authentication two-dimensional code 615B. The "cancel" control 615A is configured to cancel the authentication process. When the slave device 200 detects a touch operation performed by the user on the "cancel" control 615A, in response to the operation, the slave device 200 closes the third prompt box 615, and exits the authentication process. The authentication two-dimensional code 615B is configured to display authentication information of the slave device 200. The master device 100 may obtain the account information of the slave device 200 based on the authentication information in the authentication two-dimensional code 615B by scanning the authentication two-dimensional code 615B, to complete a temporary trusted communication connection.

For processes of authentication by the master device 100 and the slave device 200 through code scanning, refer to the processes of code scanning by the master device 100 and displaying a two-dimensional code by the slave device 200 shown in FIG. 9A and FIG. 9B.

It may be understood that in addition to the foregoing manner of authentication by code scanning, embodiments of this application may further include another manner of authentication. For example, the slave device 200 generates a verification code (for example, a PIN code) for authentication, and the master device 100 may complete authentication by inputting the verification code. A manner of authentication is not limited in embodiments of this application.

Figure 10A:
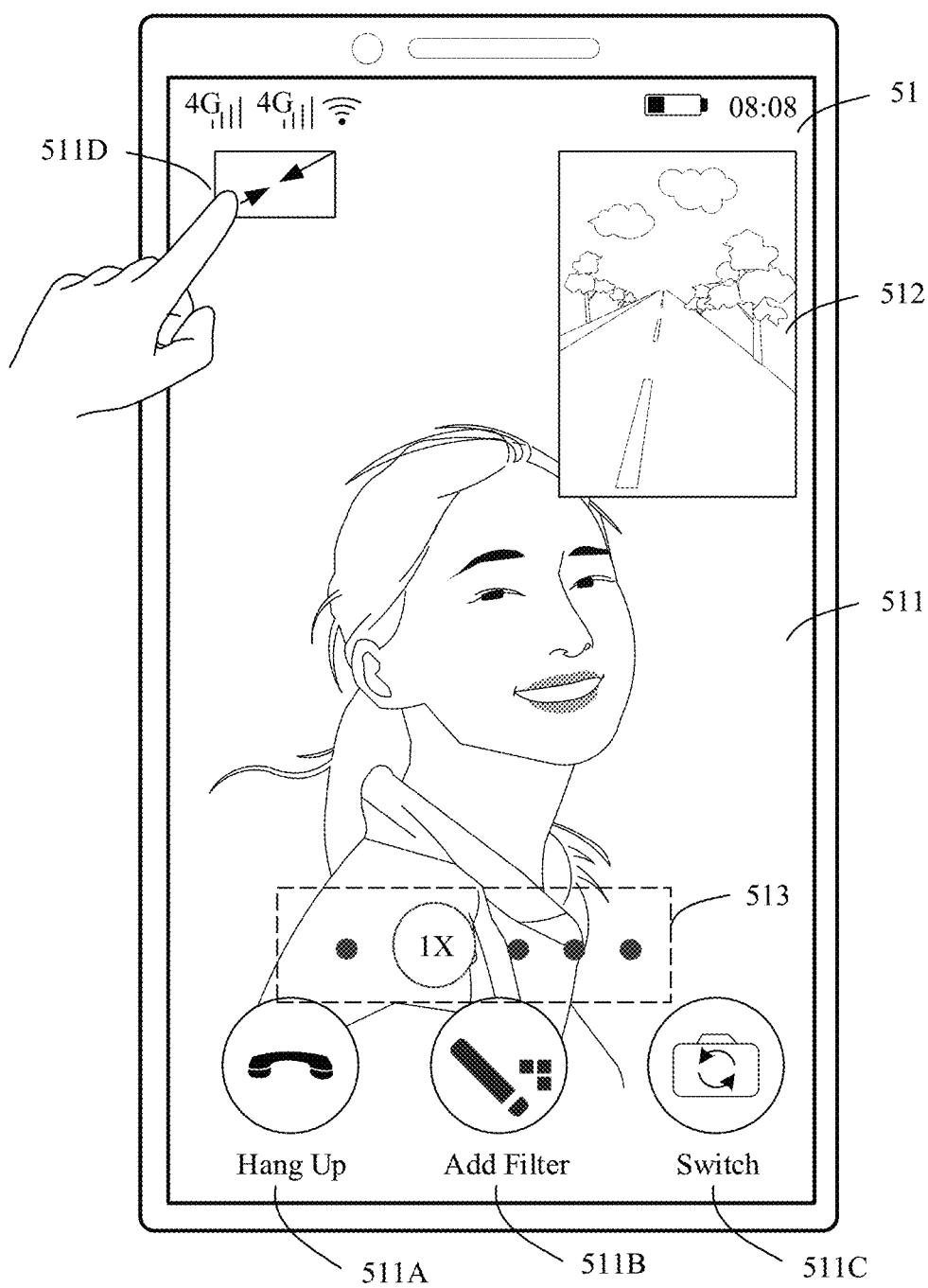
Figure 10B:
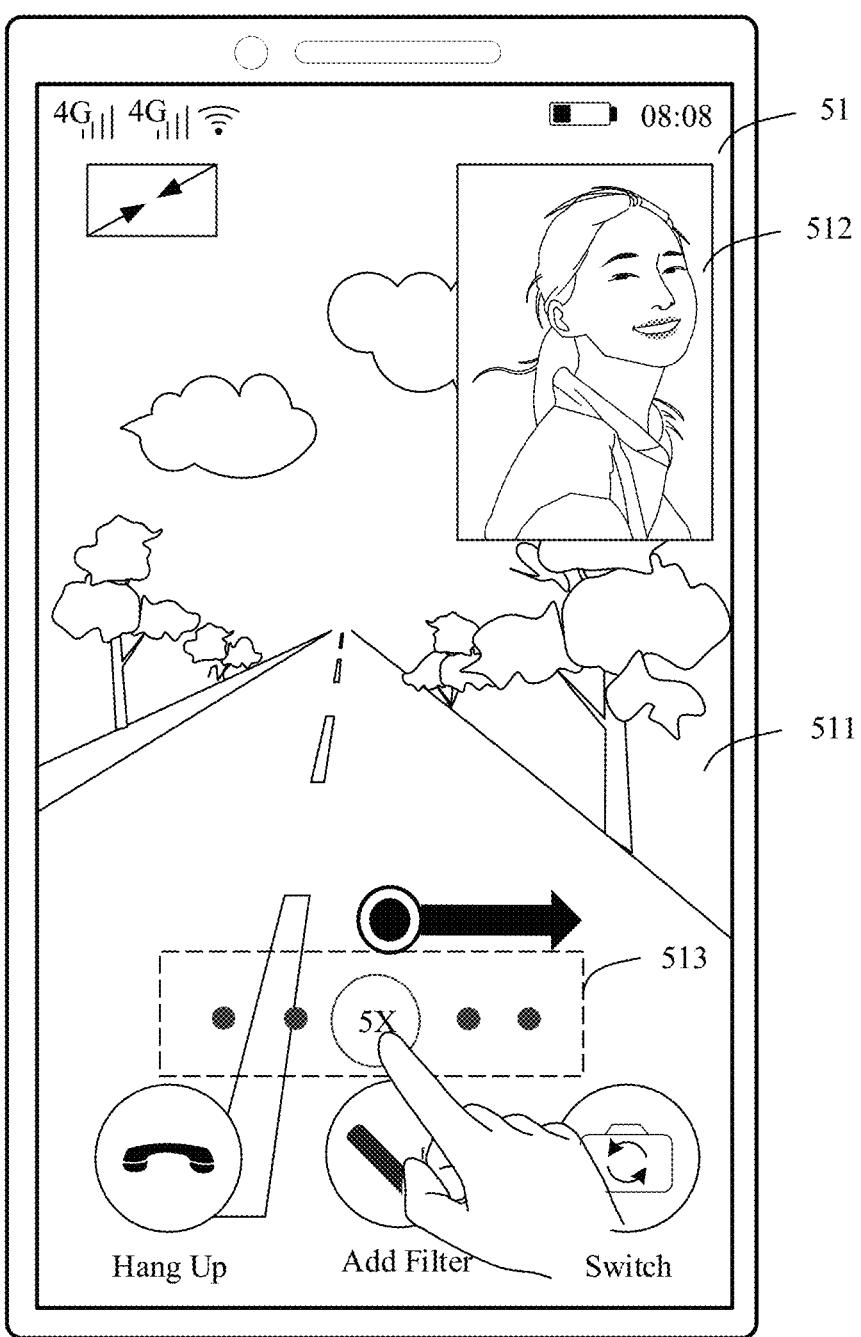
Figure 10C:
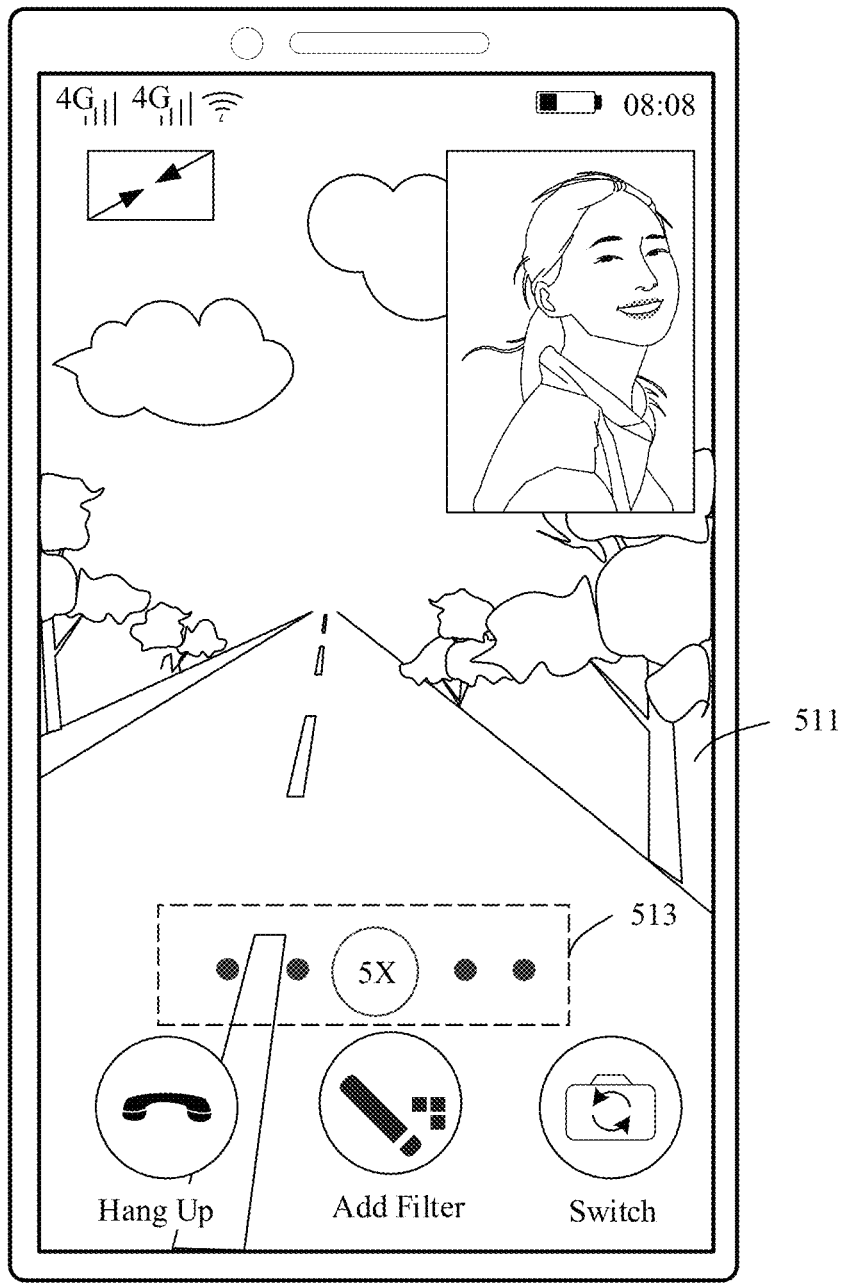

FIG. 10A to FIG. 10C show examples of some user interfaces related to the master device 100 in a process of adjusting an image by the slave device 200 when the master device 100 detects a user operation of adjusting a zoom ratio by the user after the master device 100 displays the image captured by the slave device 200.

As shown in FIG. 10A, the master device 100 is in a video call, and a child preview box 512 is configured to display the image captured by the slave device 200. In addition, the user interface 51 further includes a zoom ratio option 513. The zoom ratio option 513 may be configured to adjust a size of the image of the slave device 200. The zoom ratio option 513 further displays a zoom ratio (1×) of the current image of the slave device 200. When the zoom ratio option 513 detects an operation of swiping right by the user, the electronic device 100 generates an instruction for increasing the zoom ratio. The instruction is for zooming in on the image of the slave device 200. When the zoom ratio option 513 detects an operation of swiping left by the user, the master device 100 generates an instruction for reducing the zoom ratio. The instruction is for zooming out on the image of the slave device 200. Specifically, when the master device 100 detects an operation of zooming in by 3× performed by the user on the zoom ratio option 513, the master device 100 generates an instruction for zooming in by 3×. As shown in FIG. 10A, when the master device 100 detects a touch operation performed by the user on a preview box conversion control 511D, in response to the operation, the master device 100 converts the images displayed in a parent preview box 511 and the child preview box 512, and displays a user interface 51 shown in FIG. 10B.

As shown in FIG. 10B, the image captured by the slave device 200 is displayed in the parent preview box 511, and the image captured by the another device 500 is displayed in the child preview box 512. When the master device 100 detects a right swiping operation performed by the user on the zoom ratio option 513, the zoom ratio displayed in the zoom ratio option 513 is updated from 1× to 5×. To be specific, the master device 100 generates an instruction for zooming in by 5×, and sends the instruction to the slave device 200.

As shown in FIG. 10C, after receiving an image with display effect adjusted by the slave device 200 according to the instruction, the master device 100 displays the image with the display effect adjusted in the parent preview box 511. Compared with the image of the slave device 200 in the parent preview box 511 shown in FIG. 10B, the image of the slave device 200 in the parent preview box 511 shown in FIG. 10C has a larger angle of view.

It can be learned from the user interfaces shown in FIG. 10B and FIG. 10C that, in a process from that the master device 100 detects an operation of changing a zoom ratio by the user to that the master device 100 changes the image of the slave device 200, the master device 100 needs to receive an image, with zoom effect adjusted, sent by the slave device 200, and then displays the image on the user interface 51.

It may be understood that when an interval between sending, by the master device 100, an instruction for adjusting display effect and receiving an image of the slave device 200 is short, the master device 100 may detect an operation of changing a zoom ratio by the user, and at the same time display, in response to the operation, an image with the zoom ratio adjusted.

Figure 10D:
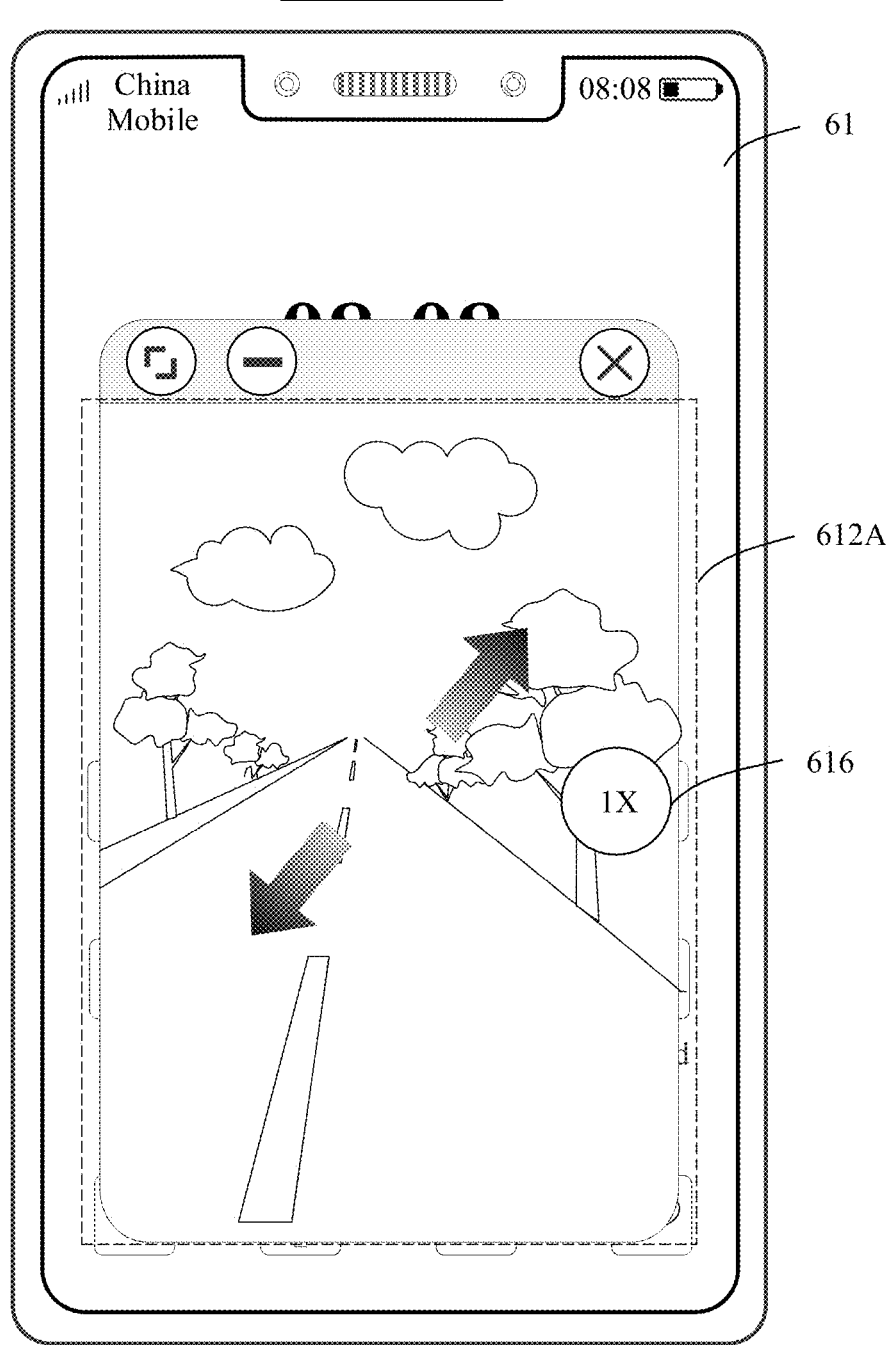
Figure 10E:
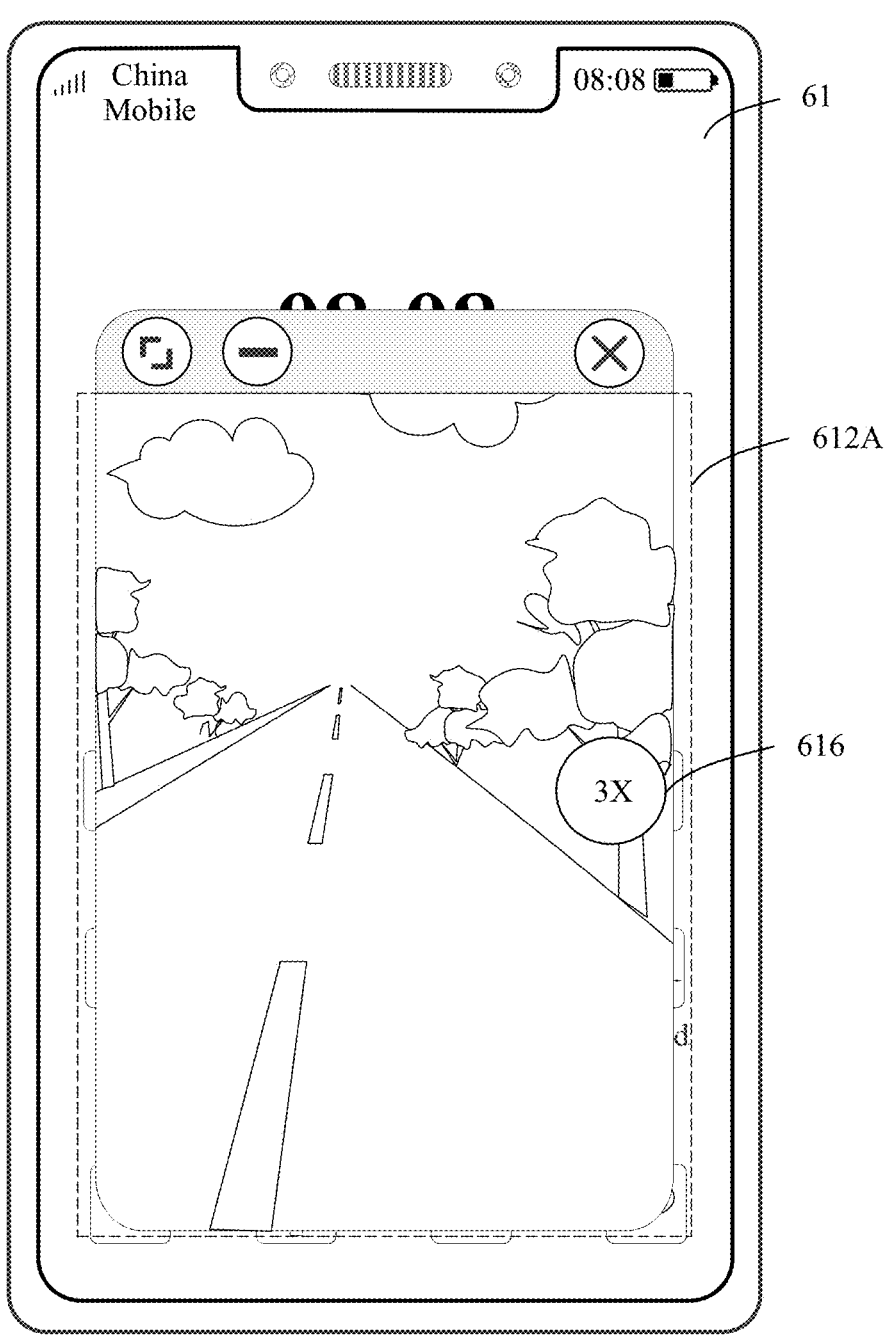

FIG. 10D and FIG. 10E show examples of some user interfaces related to the slave device 200 in a process of adjusting an image by the slave device 200 when the master device 100 detects a user operation of adjusting a zoom ratio by the user after the master device 100 displays the image captured by the slave device 200.

As shown in FIG. 10D, a user interface 61 further includes a zoom ratio icon 616. The zoom ratio icon 616 is configured to indicate a zoom ratio of an image displayed in an image preview region 612A. When the slave device 200 receives an instruction for zooming in by 5× that is sent by the master device 100, the slave device 200 performs compatibility processing on the instruction to obtain an instruction for zooming in by 3×, and zooms in on the image displayed in the image preview region 612A.

As shown in FIG. 10E, the slave device 200 zooms in on the image displayed in the image preview region 612A by 3×according to the instruction for zooming in by 3× that is obtained through compatibility processing, updates "1×" indicated by the zoom ratio icon 616 to "3×", and sends the zoomed-in image to the master device 100.

It can be learned that when the slave device 100 adjusts the display effect, the zoom ratio adjusted by the slave device 100 is within a capability range of the slave device 100. In this case, the slave device 200 obtains a 3×image in response to an instruction for zooming in by 5× that is sent by the master device 100.

It may be understood that not limited to the foregoing operation of adjusting a zoom ratio, this embodiment of this application may further include adjustment of another display effect, for example, adding a filter, changing a photographing mode, or adding body whitening effect. Specifically, when the adjustment of display effect is adding a filter, the user interface of the master device 100 may include an option of adding a filter, for example, the filter adding control 511B shown in FIG. 10A. When the master device 100 receives a user operation performed by the user on the filter adding control 511B and further adds a filter, the master device 100 may send, to the slave device 200, an instruction for adding a filter. When the slave device 200 does not have the filter selected by the user, the slave device 200 returns an image to which a default filter or another filter is added.

The following describes a detailed process of an image capture method provided in an embodiment of this application.

Figure 11:
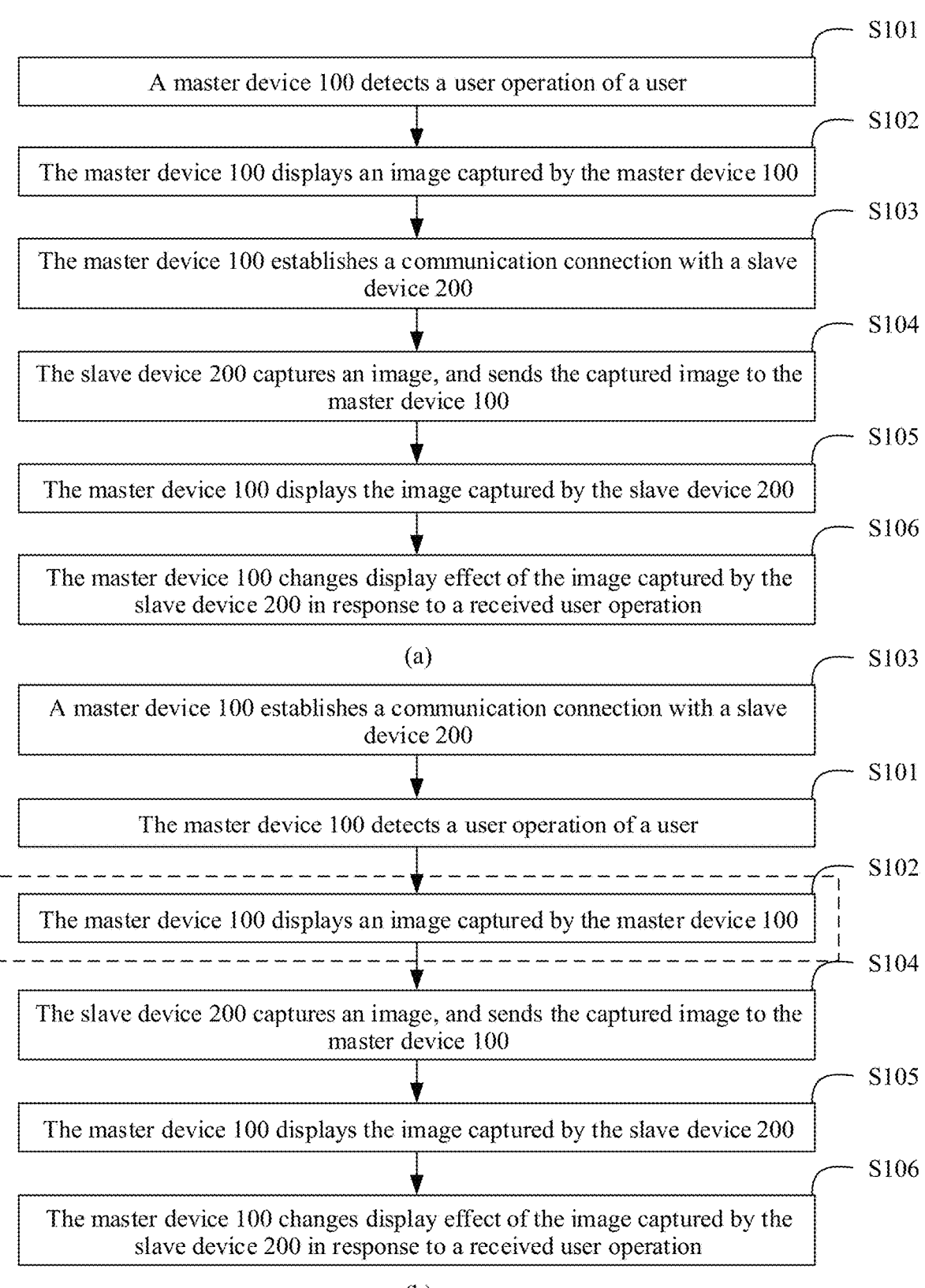
FIG. 11 is a flowchart of a method according to an embodiment of this application.

FIG. 11 is an example of a schematic flowchart of the image capture method. As shown in FIG. 11, the method may include the following steps:

S101: The master device 100 detects a user operation of a user.

The user operation may be a user operation that triggers the master device 100 to enter a photo shooting scenario, a video call scenario, a live streaming scenario, a code scanning scenario, an object recognition scenario, or an image translation scenario. In response to the operation, the master device 100 displays an image captured by a camera. The camera may be a camera of the master device 100, or may be a camera of the slave device 200. For details about whether the master device 100 displays the image captured by the camera of the master device 100 or the slave device 200, refer to subsequent content.

In some embodiments, the user operation may be a user operation performed by the user to open a photographing application of the master device 100, or the user operation may be a user operation performed by the user to enable a specific function of an application. The specific function may be a photo shooting function, a video call function, a live streaming function, a code scanning function, an object recognition function, an image translation function, or the like. The application having the foregoing specific function may be a photographing beautification application, a social application, an office application, a shopping application, or the like.

In this embodiment of this application, the user operation may be a second operation.

S102: The master device 100 displays an image captured by the master device 100.

Specifically, the master device 100 displays a user interface of a corresponding scenario in response to the user operation performed by the user to enter a photo shooting scenario, a video call scenario, a live streaming scenario, a code scanning scenario, an object recognition scenario, or an image translation scenario, turns on the camera of the master device 100, and displays, on the user interface, an image captured by the camera of the master device 100.

In this embodiment of this application, the image captured by the master device 100 may be a fourth image.

Refer to FIG. 8B. The image that is captured by the master device 100 and that is displayed by the master device 100 may be an image displayed in the child preview box 512.

In addition, S102 is an optional step. For details about whether the master device 100 performs the step S102, refer to related descriptions about an execution sequence of S101 and S103.

S103: The master device 100 establishes a communication connection with the slave device 200.

In this embodiment of this application, the communication connection established between the master device 100 and the slave device 200 may be the foregoing wired connection or wireless connection. During specific implementation, the master device 100 may establish the communication connection with the slave device 200 based on Wi-Fi near-field networking communication.

In some embodiments, the master device 100 may first discover another electronic device with a camera in response to a received user operation (for example, the user operation performed on the "HyperTerminal" control 311 shown in FIG. 5B, or the user operation performed on the "switch camera" control 712 shown in FIG. 8B), and then send, to an electronic device selected by the user, a request for establishing a communication connection. After receiving feedback information that indicates that the communication connection is allowed to be established and that is sent by the electronic device selected by the user, the master device 100 successfully establishes the communication connection with the electronic device.

The electronic device that establishes the communication connection with the master device 100 is the slave device 200.

The establishment of the communication connection between the master device 100 and the slave device 200 includes but is not limited to the following two cases:

1. The slave device 200 is a trusted device.

When the slave device 200 is a trusted device, after receiving the request for establishing the communication connection that is sent by the master device 100, the slave device 200 may directly send, to the master device 100, feedback information indicating that the communication connection is allowed to be established, to complete establishment of the communication connection. In this way, an operation of the user can be simplified, which facilitates the user to control the master device or the slave device.

Specifically, when the slave device 200 is a trusted device, for a process of establishing a communication connection between the master device 100 and the slave device 200, refer to the user interfaces shown in FIG. 5C and FIG. 5D and related descriptions thereof.

2. The slave device 200 is an untrusted device.

In a case that the slave device 200 is an untrusted device, when the master device 100 sends, to the slave device 200, a request for establishing a communication connection, the master device 100 and the slave device 200 enter an authentication process, and the master device 100 verifies account information of the slave device 200. When the master device 100 and the slave device 200 complete the authentication process, establishment of the communication connection is completed. In this way, security of communication between the master and slave devices can be ensured.

In some embodiments, the authentication process of the master device 100 and the slave device 200 may be a code scanning verification process. Specifically, when the slave device 200 is an untrusted device, for an authentication process of the master device 100 and the slave device 200, refer to the user interfaces shown in FIG. 9A to FIG. 9C and related descriptions thereof.

In some other embodiments, the authentication process of the master device 100 and the slave device 200 may be a PIN code authentication process. Specifically, when the master device 100 initiates, to the slave device 200, a request for establishing a communication connection, the slave device 200 displays, on a user interface of the slave device 200, a PIN code for authentication, and the master device 200 may provide an input interface for inputting the PIN code. When the user inputs, on the master device 100, the PIN code displayed by the slave device 200, the authentication process of the master device 100 and the slave device 200 can be completed.

It can be learned that distinguishing between a trusted device and an untrusted device optimizes an operation of switching the master and slave devices by the user. A slave device that has not established a communication connection needs to establish the communication connection through authentication. When the user again selects the slave device that has established the communication connection, authentication may not be performed again. Alternatively, when the user selects another electronic device with an account the same as that of the master device 100 to be connected to the master device 100, an authentication process may be omitted. In this way, an operation is simplified, and security of communication between the devices is ensured.

It may be understood that, in another embodiment of this application, a trusted device and an untrusted device may not be distinguished, and all devices found by the master device may be processed in a connection manner of the trusted device, or may be processed in a connection manner of the untrusted device.

Not limited to the foregoing manner, the master device 100 may alternatively establish a communication connection in another manner. For example, verification is performed by inputting a verification code, or a touch operation is performed based on an NFC technology. This is not limited in embodiments of this application.

It may be understood that an execution sequence of S101 and S103 is not limited.

In this embodiment of this application, S101 and S103 may be performed in the following two sequences:

1. S101 is First Performed, and then S103 is Performed.

When the master device first performs S101 and then performs S103, for a schematic flowchart of the method, refer to the flowchart shown in (a) in FIG. 11.

As shown in (a) in FIG. 11, the master device 100 may sequentially perform S101, S102, and S103. In addition, the user operation in the step S101 may be a user operation performed on the answer control 411 shown in FIG. 8A. The user operation is for triggering the master device 100 to display an image captured by a camera of the master device 100.

To be specific, after detecting a user operation of enabling a camera function by the user, the master device 100 may search for another electronic device with a camera, and select the slave device 200 to establish a communication connection. In this case, in response to the foregoing user operation, the master device 100 displays the image captured by the camera of the master device 100. Then, after the master device 100 establishes the communication connection with the slave device 200, the image captured by the camera of the master device 200 is replaced with an image captured by a camera of the slave device 200.

In this way, when the master device 100 enters a photographing scenario, the user can choose whether to switch an image displayed on a user interface from the image captured by the camera of the master device 100 to the image captured by the camera of the slave device 200, thereby increasing flexibility of selection by the user.

In some embodiments, after entering a photographing scenario, the master device 100 may display a control or an icon (for example, the "switch camera" option 712A shown in FIG. 8C) for establishing the communication connection with the slave device 200. The user may search for another electronic device with a camera by using the control or the icon, to further obtain an image captured by a camera of the another electronic device. Specifically, after the master device 100 enters the photographing scenario, the master device 100 calls a Camera API interface. The master device 100 may provide a system-level control entry when detecting that the Camera API interface is called. The system-level control entry may be displayed on the user interface for triggering by the user. When the system-level control entry detects a touch operation of the user, the electronic device 400 displays a found electronic device with a camera. Specifically, for detailed content of first performing S101 and then performing S103 by the master device 100, refer to the user interfaces and related descriptions thereof involved when the master device 100 establishes the communication connection with the slave device 200 after detecting the user operation of enabling the camera function by the user and entering the video call scenario shown in FIG. 8A to FIG. 8G.

It may be understood that a presentation form and a location of the system-level control entry are not limited in embodiments of this application. The system-level control entry may be a notification option in a notification bar mentioned in the foregoing embodiments, or a floating ball that appears when a photographing scenario is entered, or may be a shortcut option located in a device control center or a shortcut operation bar.

2. S103 is first performed, and then S101 is performed.

When the master device 100 first performs S103 and then performs S101, for a schematic flowchart of the method, refer to the flowchart shown in (b) in FIG. 11.

As shown in (b) in FIG. 11, the master device 100 may not perform S102, and the master device 100 may perform S101 after performing S103. In addition, the user operation in S101 may be a user operation performed on the answer control 411 shown in FIG. 6A. The user operation is for triggering the master device 100 not to display an image captured by a camera of the master device 100, and display an image captured by a camera of the slave device 200.

To be specific, the master device 100 may first determine the slave device 200 with which a communication connection needs to be established, and establish the communication connection with the slave device 200 before the master device 100 detects the foregoing user operation. In this case, when the master device 100 displays an image captured by a camera, the camera may be a camera of the slave device 200.

In this way, when the master device 100 displays, in response to the user operation, the image captured by the camera, the camera of the master device 100 does not need to be turned on, thereby improving working efficiency of the master device 100. The master device 100 does not need to select a device with which a communication connection needs to be established, and directly displays the image captured by the camera of the slave device 200.

In some embodiments, the master device 100 may trigger, by setting an application, the master device 100 to establish the communication connection with the slave device 200 before the master device 100 enters a photographing scenario. Specifically, for detailed content of first performing S101 and then performing S102 by the master device 100, refer to the user interfaces and related descriptions thereof when the master device 100 establishes the communication connection with the slave device 200 shown in FIG. 5A to FIG. 5D, and when the master device 100 detects the user operation of enabling the video call function by the user after the master device 100 completes the establishment of the communication connection with the slave device 200 shown in FIG. 6A to FIG. 6C.

S104: The slave device 200 captures an image, and sends the captured image to the master device 100.

That the slave device 200 captures the image includes but is not limited to the following two triggering manners:

1. The master device 100 receives an operation of entering a photographing scenario by the user, and triggers the slave device 200 to capture the image. The photographing scenario may be a photo shooting scenario, a video call scenario, a live streaming scenario, a code scanning scenario, an object recognition scenario, an image translation scenario, or the like. When the master device 100 has established the communication connection with the slave device 200, the master device 100 detects the user operation of entering the photographing scenario by the user, and in response to the operation, the master device 100 obtains and displays the image captured by the slave device 200.

In this embodiment of this application, the operation may be a second operation.

2. The master device 100 receives an operation of switching to a peer camera by the user, and triggers the slave device 200 to capture the image. When the master device 100 has established the communication connection with the slave device 200, the master device 100 may detect, in a photographing scenario, the operation of switching to the peer camera by the user, and in response to the operation, the master device 100 obtains and displays the image captured by the slave device 200, and no longer displays the image captured by the camera of the master device 100.

In this embodiment of this application, the operation may be a third operation.

Specifically, the slave device 200 may capture the image when receiving a request sent by the master device 100 for obtaining the image captured by the slave device 200.

In some embodiments, when detecting a user operation (for example, the touch operation performed on the "answer" control 411 shown in FIG. 6A) of enabling a camera function by the user, the master device 100 may send, to the slave device 200 in response to the operation, a request for obtaining the image captured by the slave device 200. Alternatively, further, the master device 100 may further include prompt information. When receiving the user's confirmation of obtaining the image captured by the slave device 200 (for example, the touch operation performed on the confirm control 413B shown in FIG. 6B), the master device 100 sends, to the slave device 200, a request for obtaining the image captured by the slave device 200.

The slave device 200 may display the image while capturing the image, and send the captured image to the master device 100.

In this embodiment of this application, the image captured by the slave device 200 may be a first image. The first image is an image obtained by the camera of the slave device 200 based on a preset image capture parameter before an image capture parameter for adjusting display effect that is sent by the master device 100 is received.

Refer to the user interface shown in FIG. 7A. After receiving the request for capturing the image of the slave device 200 that is sent by the master device 100, the slave device 200 displays the first prompt box 611 for prompting the user whether to capture the image, and sends the image to the master device 100. After receiving an operation that the user agrees to capture and send the image, the slave device 200 updates the first prompt box 611 to the image preview window 612 shown in FIG. 7B. The window may be configured to display the image captured by the slave device 200.

S105: The master device 100 displays the image captured by the slave device 200.

Specifically, the master device 100 transfers a data stream of the slave device 200 through a channel, of the master device 100, for transferring the data stream. A data stream is a sequence of data that arrives sequentially, rapidly, and continuously in a large quantity. Generally, a data stream may be considered as a set of dynamic data that increases infinitely with time. The data stream in this application is an image stream formed by images frame by frame. The image stream is the image sent by the slave device 200 to the master device 100.

To be specific, when the master device 100 displays the image captured by the camera of the master device 100, the master device 100 does not display the image captured by the slave device 200; or when the master device 100 displays the image captured by the slave device 200, the master device 100 does not display the image captured by the camera of the master device 100. The master device 100 may switch, by establishing the communication connection with the slave device 200, between the image captured by the camera of the master device 100 and the image captured by the camera of the slave device.

When the master device 100 first establishes the communication connection with the slave device 200, and then displays the image, the master device 100 may directly transfer, through the channel of the master device 100 for transferring the data stream, the data stream sent by the slave device 200.

Figure 12:
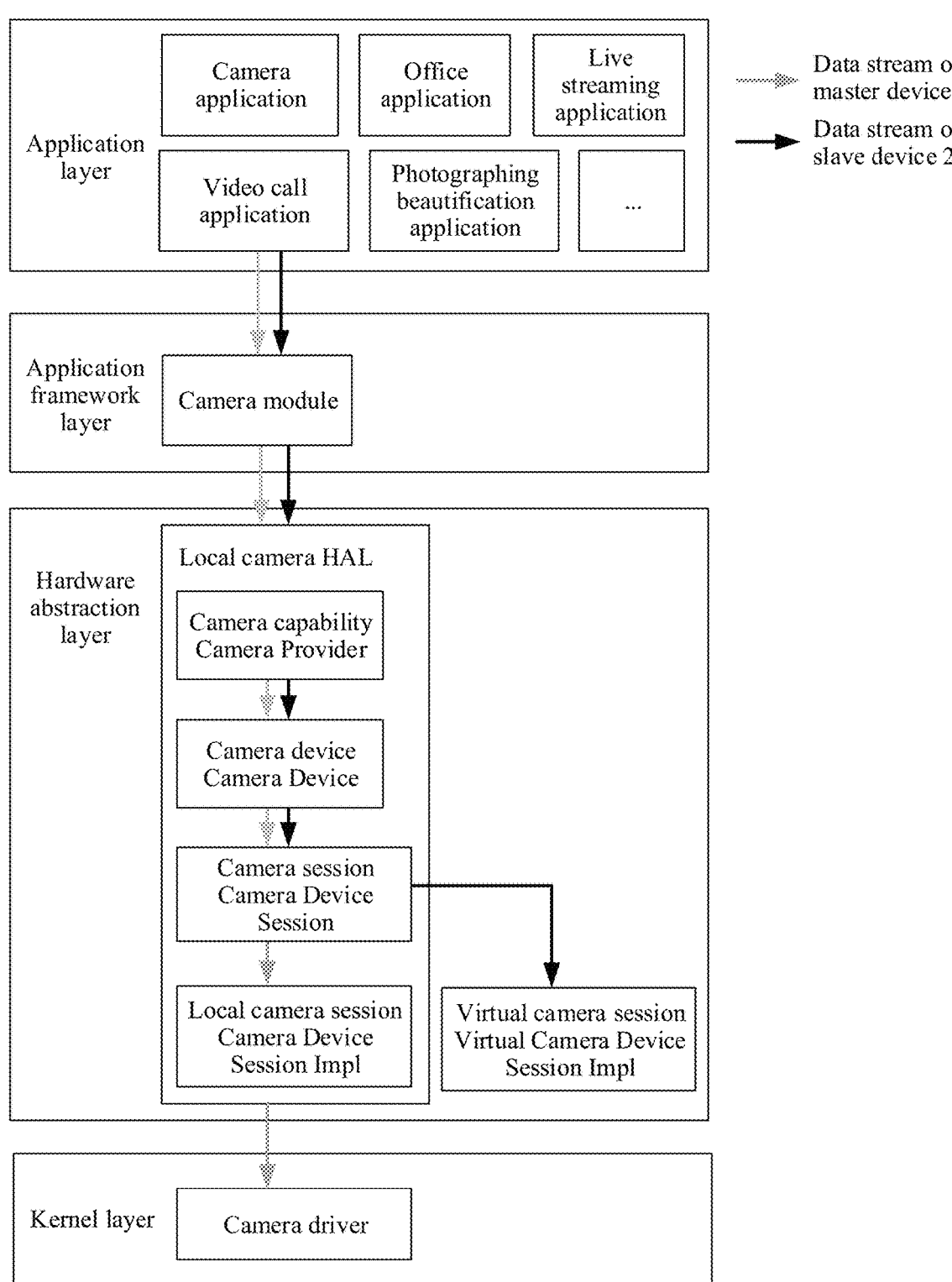
FIG. 12 is a diagram of a direction of a data stream according to an embodiment of this application.

FIG. 12 is an example of a schematic diagram of a direction of a data stream of the master device 100.

As shown in FIG. 12, a block diagram of a software structure of the master device 100 may include an application layer, an application framework layer, a hardware abstraction layer (hardware abstraction layer, HAL), and a kernel layer.

The application layer may include various applications with cameras, such as a camera application, an office application, a live streaming application, a video call application, and a photographing beautification application. The application framework layer may include a camera module. The camera module may include a camera service, a camera capability, a camera device, and the like. The hardware abstraction layer may include a local camera HAL. The local camera HAL may include Camera Provider, Camera Device, Camera Device Session, and Camera Device Session Impl. The kernel layer may include a camera driver. The camera driver is configured to drive a local camera.

FIG. 12 shows an example of a schematic process of a direction of a data stream of the camera of the master device 100 when the master device 100 displays the image captured and collected by the master device 100, and a schematic process of a direction of a data stream of the camera of the slave device 200 when the master device 100 displays the image of the slave device 200.

Refer to the user interface shown in FIG. 6B. When detecting an operation that the user allows display of the image captured by the slave device 200, the master device 100 enters the video call interface shown in FIG. 6C. After obtaining the image captured by the slave device 200, the master device 100 displays, in the child preview box 512, the image captured by the slave device 200.

When the master device 100 first displays the image and then establishes the communication connection with the slave device 200, the master device 100 may replace the data stream collected by the local camera with the data stream collected by the slave device 200.

Refer to the user interface shown in FIG. 8B. The master device 100 displays, in the child preview box 512, the image captured by the local camera. As shown in FIG. 8D, when the master device 100 detects that the user selects the "P1" device to establish a communication connection, the master device 100 replaces the data stream of the local end with the data stream collected by the slave device 200. Refer to FIG. 8E. The master device 100 displays, in the child preview box 512, the image captured by the slave device 200.

It can be learned that because the master device 100 transfers, through the channel that is of the master device 100 and that is for transferring the data stream, the data stream sent by the slave device 200, the master device 100 can obtain the image captured by the slave device 200 without modifying a manner of calling a system interface by a third-party application, that is, without adaptive modification of the third-party application. The slave device 200 may be considered as a remote camera of the master device 100. An application layer of the master device 100 does not need to sense whether the image displayed on the user interface is from the master device 100 or the slave device 200. The master device 100 may further detect a user operation of adjusting, by the user, display effect of the image captured by the slave device 200, and generate an instruction for adjusting the display effect of the image.

S106: The master device 100 changes display effect of the image of the slave device 200 in response to a received user operation.

The user operation may be an operation of adjusting the display effect by the user, for example, an operation of adding a filter, an operation of turning on a flash, or an operation of changing a photographing mode.

In this embodiment of this application, the user operation may be a first operation. The user operation may indicate an image capture parameter adjusted by the user. The image capture parameter is within an image capture capability range of the master device 100. The image capture parameter may be a second image capture parameter.

Specifically, the user operation may be the user operation performed on the zoom ratio option 513 shown in FIG. 10B.

The master device 100 generates, according to the received user operation, an image capture parameter for adjusting the display effect. The image capture parameter may include but is not limited to a hardware parameter of a camera involved in image capture, and/or a software parameter involved in image processing. The image capture parameter further includes a combination parameter of some hardware parameters and software parameters, such as a hybrid zoom range, a night mode, a portrait mode, time-lapse, slo-mo, a panoramic mode, or HDR.

The hardware parameter includes one or more of the following: an ID of a camera, an optical zoom range, whether to enable optical image stabilization, an aperture size adjustment range, whether to turn on a flash, whether to turn on a fill light, a shutter time, an ISO photosensitive value, a pixel, a video frame rate, and the like.

The software parameter includes one or more of the following: a digital zoom value, a size for image cropping, a color temperature calibration mode of an image, whether to perform image denoising, a beauty/body shaping type, a filter type, a sticker option, whether to enable selfie mirroring, and the like.

That the master device 100 changes the display effect of the image captured by the slave device 200 includes the following three cases:

1. The master device 100 adjusts the display effect.

In this case, the slave device 200 only sends, to the master device 100, the image captured by the camera of the slave device 200, and the master device 100 completes adjustment of the display effect of the image.

Specifically, when detecting an operation of adjusting the display effect by the user, the master device 100 generates, in response to the operation, an instruction for adjusting the display effect. The master device 100 adjusts, according to the instruction, the image captured by the slave device 200, and displays an adjusted image.

In this case, the master device 100 can only complete adjustment of the software parameter. When the master device 100 completes the adjustment of the software parameter, the master device 100 adjusts, based on the software parameter, the image captured by the slave device 200.

In a case that the master device 100 adjusts the display effect, before adjustment of the master device 100, the image sent by the slave device 100 may be a second image. The second image is an image obtained by the slave device 100 based on a preset image capture parameter. After adjustment of the master device 100, the image displayed on the interface may be a third image. The third image is an image obtained after the master device 100 adjusts the second image based on an image capture parameter indicated by a user operation.

2. The slave device 200 adjusts the display effect.

In this case, in addition to sending the captured image to the master device 100, the slave device 200 can further obtain an instruction of the master device 100 for adjusting image capture effect, obtain an adjusted image according to the instruction, and send the adjusted image to the master device 100.

Specifically, when detecting an operation of adjusting the display effect by the user, the master device 100 generates, in response to the operation, an instruction for adjusting the display effect, and sends the instruction to the slave device 200. After receiving the instruction, the slave device 200 captures and processes the image according to the instruction, and sends an adjusted image to the master device 100.

In this case, the slave device 200 may complete adjustment of the hardware parameter and/or the software parameter. When the slave device 200 completes the adjustment of the hardware parameter, the slave device 200 obtains an adjusted image based on the hardware parameter. When the slave device 200 completes the adjustment of the software parameter, the slave device 200 adjusts, based on the software parameter, the image captured by the slave device 200.

When the slave device 200 adjusts the display effect, the master device 100 may send, to the slave device 200, an image capture parameter indicated by the operation for adjusting the display effect, and the slave device 200 obtains the image based on the image capture parameter.

3. The master device 100 and the slave device 200 together adjust the display effect.

That the master device 100 and the slave device 200 together adjust the display effect may include but is not limited to the following two cases:

(1) The display effect is first adjusted by the slave device 200, and the master device 100 further processes an image adjusted by the slave device 200.

Specifically, the master device 100 sends, to the slave device 200, an instruction for adjusting the display effect, and the slave device 200 adjusts the display effect. When the slave device 200 cannot adjust the display effect, or partially adjusts the display effect, the master device 200 further adjusts an image adjusted by the slave device 200.

For example, when the adjustment of the display effect involves adjustment of a hardware parameter and adjustment of a software parameter, the master device 100 completes the adjustment of the hardware parameter, and the slave device 200 completes the adjustment of the software parameter.

In this case, an image finally obtained by the master device 100 is an image obtained after the slave device 200 first performs adjustment based on an image capture parameter (that is, the second image capture parameter) and the master device 200 then performs adjustment based on the parameter.

(2) Some display effects are adjusted by the master device 100, and the other display effects are adjusted by the slave device 200.

The user adjusts the display effect of the image by using the master device 100, so using the master device 100 to complete the adjustment of the user can better achieve effect desired by the user. However, the master device 100 can only perform further processing on the image, but cannot adjust the image itself. Therefore, some display effects can be adjusted only by the slave device 100 that captures the image, for example, whether to turn on a flash, switch between different cameras, and whether to enable optical image stabilization.

In this case, when detecting an operation of adjusting the display effect by the user, the master device 100 determines whether the operation can be completed by the master device 100. If the operation can be completed by the master device 100, the display effect is adjusted by the master device 100. If the operation cannot be completed by the master device 100, the display effect is adjusted by the slave device 200.

For example, when the master device 100 detects a user operation of continuous zooming, which includes digital zooming and optical zooming, the master device 100 completes the digital zooming, and the slave device 200 completes the optical zooming.

In this case, the slave device 200 may partially adjust the display effect, and the master device 100 further adjusts the image adjusted by the slave device 200. Alternatively, similar to that the master device 100 and the slave device 200 separately adjust the display effect, the adjustment of the display effect is divided into two types: one type of the adjustment is completed by the master device 100, and the other type of the adjustment is completed by the slave device 200.

Further, for the case 2 in which the slave device 200 adjusts the display effect, and the case 3 in which the slave device performs adjustment first and then the master device performs further adjustment based on the adjustment of the slave device, because a device type, a device model, and the like of the master device 100 are different from those of the slave device 200, the instruction generated by the master device 100 may be an instruction that cannot be recognized or supported by the slave device 200, that is, an image capture parameter carried in the instruction is outside the image capture capability range of the slave device 200. Then, after receiving the instruction generated by the master device 100, the slave device 200 may perform compatibility processing on the instruction, to obtain an instruction that can be recognized or processed by the slave device 200. An image capture parameter carried in the instruction is within the image capture capability range of the slave device 200. In this case, the slave device 200 can effectively complete adjustment of a corresponding display effect in response to the processed instruction.

Specifically, after receiving the instruction of the master device 100 for adjusting the display effect, the slave device 200 may perform compatibility processing on the instruction. Then, the slave device 200 obtains an image according to the processed instruction, and sends an adjusted image to the master device 100. The master device 100 receives and displays the image adjusted by the slave device 200.

The compatibility processing may include but is not limited to: modifying an instruction format, modifying an instruction parameter, returning to a default instruction, and discarding an instruction. The modifying an instruction format may be modifying an instruction sent by the master device 100 to an instruction that can be recognized by the slave device 200. The modifying an instruction parameter may be changing a parameter of the display effect, for example, a digital zoom value, a size for image cropping, or a shutter time. The returning to a default instruction may mean that the image capture parameter is modified to a parameter specified by the slave device 200. To be specific, when the slave device 200 cannot recognize or does not support the instruction generated by the master device 100, the slave device 200 adjusts the display effect of the image based on a set instruction parameter. For example, when the slave device 200 does not have a filter indicated by the master device 100, the slave device 200 adjusts the image by using a default filter. The filter may be a first filter in a filter list of the slave device 200, or may be a filter that is determined by the slave device 200 and that is most similar to the filter indicated by the master device 100.

In this embodiment of this application, the image capture parameter carried in the instruction obtained through the compatibility processing by the slave device 200 may be a third image capture parameter.

Specifically, the master device 100 may send, to the slave device 200 through a DMSDP channel, the instruction for adjusting the display effect.

Refer to FIG. 10B. The master device 100 detects the user operation of zooming in by 5× by the user. In this case, the master device 100 generates an instruction for zooming in by 5×, and sends the instruction to the slave device 200. The slave device 200 performs compatibility processing on the instruction, to obtain an instruction for zooming in by 3×. Refer to FIG. 10E. The slave device 200 adjusts the image according to the processed instruction, and zooms in on the image by 3×.

It may be understood that the image capture method provided in this embodiment of this application may include only some of the foregoing steps. Specifically, an image capture method may include only the foregoing steps S103 to S106. In this way, after establishing the connection with the slave device 200, the master device 100 may adjust the display effect of the image of the slave device 200, and display the image on the user interface of the master device 100. Alternatively, an image capture method may include only the foregoing steps S101 to S105. In this way, the master device 100 may choose, by determining whether to establish a communication connection with the slave device 200, whether to display the image captured by the slave device 200. The foregoing steps may be alternatively combined in another form. This is not limited in embodiments of this application.

Figure 13:
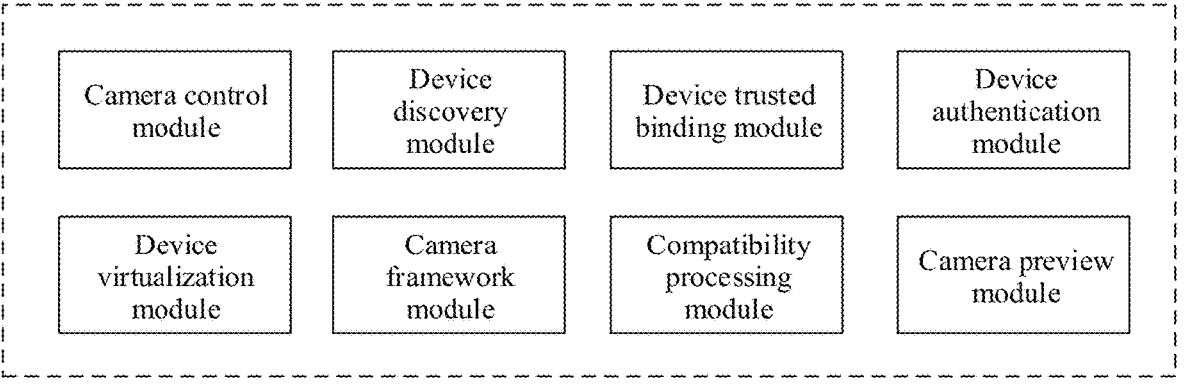
FIG. 13 is a schematic diagram of a structure of an image capture system according to an embodiment of this application.

FIG. 13 is an example of a schematic diagram of a structure of an image capture system.

Refer to FIG. 13. The image capture system may be used in the master device 100 or the slave device 200. The image capture control system includes a camera control module, a device discovery module, a device trusted binding module, a device authentication module, a device virtualization module, a camera framework module, a compatibility processing module, and a camera preview module.

The camera control module may be configured to monitor a user operation performed by the user to trigger the master device 100 to enter a photographing scenario. When detecting that the master device 100 enters the photographing scenario, an electronic device provides a system-level control entry. The system-level control entry is displayed on a user interface of the electronic device. The system-level control entry may detect a touch operation of the user, and display, in response to the operation, a device with a camera that is found by the master device 100.

The device discovery module may be configured to search for a device with a camera in a near-field range or in a long-distance connection. The near-field range may be a short-distance connection range like a Wi-Fi connection, a Bluetooth connection, an infrared connection, an NFC connection, or a ZigBee connection. The device in the long-distance connection may be, for example, a device that logs in to a same user account (for example, a Huawei account).

The device trusted binding module may be configured to establish a communication connection between the master device 100 and the slave device 200, and bind the master device 100 and the slave device 200 together.

The device authentication module may be configured to complete an authentication process of the master device 100 and the slave device 200. In this case, the slave device 200 may be an untrusted device.

The device virtualization module may be configured to virtualize a camera of the slave device 200, and map the camera to a virtual device node that can be accessed by the master device 100, that is, virtualize the camera of the slave device 200 into a remote camera of the master device 100. In addition, the device virtualization module may be further configured to capture an image of the slave device 200.

The camera framework module may be configured to transfer a data stream of the camera of the slave device 200 through a channel, of the master device 100, for transferring a data stream of a camera; or replace a data stream of a camera of the master device 100 with a data stream of the camera of the slave device 200.

The compatibility processing module may be configured to perform compatibility processing on an instruction to obtain an instruction that can be recognized or processed by the slave device 200.

The camera preview module may be configured to provide a preview interface for the slave device 200, and display an image captured by the called camera of the slave device 200.

The implementations of this application may be randomly combined, to achieve different technical effects.

All or some of the foregoing embodiments may be implemented by software, hardware, firmware, or any combination thereof. When implemented by software, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid-state drive, SSD)), or the like.

A person of ordinary skill in the art may understand that all or some of the processes of the methods in embodiments may be implemented by a computer program instructing related hardware. The program may be stored in a computer-readable storage medium. When the program is executed, the processes of the methods in embodiments may be performed. The foregoing storage medium includes any medium that can store program code, for example, a ROM, a random access memory RAM, a magnetic disk, or an optical disc.

In conclusion, the foregoing descriptions are merely embodiments of the technical solutions of the present disclosure, but are not intended to limit the protection scope of the present disclosure. Any modification, equivalent replacement, or improvement made according to the disclosure shall fall within the protection scope of the present disclosure.

What is claimed is:

1. An electronic device, comprising:
a memory storing instructions; and
at least one processor in communication with the memory, the at least one processor configured, upon execution of the instructions, to perform the following steps:
receiving a first image sent by a second device, the first image being obtained by the second device based on a preset first image capture parameter;
displaying the first image on an interface;
receiving a first operation performed on the interface;
receiving, after receiving the first operation on the interface, a second image sent by the second device; and
displaying a third image on the interface in response to the first operation, and stopping displaying the first image, the third image being obtained by the electronic device by processing the second image based on a second image capture parameter indicated by the first operation, or the third image is the second image and the second image is obtained by the second device based on the second image capture parameter indicated by the first operation, and the second image capture parameter is within an image capture capability range of the electronic device, wherein the second image capture parameter comprises one or both of a software image capture parameter or a hardware image capture parameter.

2. The electronic device according to claim 1, wherein before the receiving the first operation performed on the interface, the one or more processors further execute the instructions to perform the following:
receiving the first image sent by the second device, wherein the first image is obtained by the second device based on the preset first image capture parameter; and
displaying the first image on the interface;
displaying the third image on the interface in response to the first operation; and
stopping displaying the first image.

3. The electronic device according to claim 2, wherein before the receiving the first image sent by the second device, the one or more processors further execute the instructions to perform the following:
sending a first request to the second device, wherein the first request is for triggering the second device to obtain the first image.

4. The electronic device according to claim 1 wherein the third image is obtained by the electronic device by processing the second image based on the second image capture parameter indicated by the first operation, and the second image is obtained by the second device based on the preset first image capture parameter.

5. The electronic device according to claim 1, wherein the third image is obtained by the electronic device by processing the second image based on the second image capture parameter indicated by the first operation; and
before the receiving the second image sent by the second device, the one or more processors further execute the instructions to perform the following:
sending the second image capture parameter to the second device, wherein the second image is obtained by the second device based on the second image capture parameter.

6. The electronic device according to claim 1, wherein the second image is obtained by the second device based on the second image capture parameter; and if the second image capture parameter is outside an image capture capability range of the second device, the second image is obtained by the second device based on a third image capture parameter, wherein the third image capture parameter is within the image capture capability range of the second device and is closest to the second image capture parameter, or the third image capture parameter is a preset third image capture parameter.

7. The electronic device according to claim 1, wherein the interface further displays a plurality of image capture options, and image capture parameters corresponding to the plurality of image capture options are within the image capture capability range of the electronic device;

the first operation comprises an operation performed on an image capture option; and the second image capture parameter comprises an image capture parameter corresponding to the image capture option on which the first operation is performed.

8. The electronic device according to claim 1, wherein before the receiving the first image sent by the second device, the one or more processors further execute the instructions to perform the following:

displaying a fourth image on the interface, wherein the fourth image is obtained by the electronic device;

displaying the first image on the interface; and stopping displaying the fourth image.

9. The electronic device according to claim 1, wherein the application comprises one or more of the following: a video call application, a photographing application, a live streaming application, an image recognition application, or an image translation application.

10. The electronic device according to claim 9, wherein:

the application is the video call application; and after the displaying the third image on the interface in response to the first operation, and stopping displaying the first image, the one or more processors further execute the instructions to perform the following:

sending the third image to a server corresponding to the video call application, for the server to send the third image to a third device.

11. The electronic device according to claim 1, wherein the software image capture parameter comprises one or more of: a digital zoom value, a size for image cropping, a color temperature calibration mode of an image, whether to perform image denoising, a beauty or body shaping type, a filter type, a sticker option, or whether to enable selfie mirroring;

wherein the hardware image capture parameter comprises one or more of: a quantity of cameras, a camera type, an optical zoom value, whether to enable optical image stabilization, an aperture size, whether to turn on a flash, whether to turn on a fill light, a shutter time, an ISO photosensitive value, a pixel, or a video frame rate.

12. The electronic device according to claim 1, wherein the second image capture parameter comprises a combination image capture parameter, the combination image capture parameter comprising one or more of: a hybrid zoom range, a night mode, a portrait mode, a time-lapse mode, a slow motion (slo-mo) mode, a panoramic mode, or a high dynamic range (HDR).

13. An electronic device, comprising:

a memory storing instructions; and at least one processor in communication with the memory, the at least one processor configured, upon execution of the instructions, to perform the following steps:

receiving a second operation;

receiving, in response to the second operation when a communication connection has been established between the electronic device and a second device, a first image sent by the second device, the first image being obtained by the second device based on a preset first image capture parameter;

displaying the first image on an interface of an application, and skipping displaying a fourth image, before the communication connection has been established with the second device, the second operation is for the electronic device to display the fourth image, and the fourth image is obtained by the electronic device;

displaying the third image on the interface in response to the first operation, and stopping displaying the first image;

receiving a first operation performed on the interface;

receiving a second image sent by the second device; and displaying a third image on the interface in response to the first operation, wherein the third image is obtained by the electronic device by processing the second image based on a second image capture parameter indicated by the first operation, or the third image is the second image obtained by the second device based on the second image capture parameter indicated by the first operation, and the second image capture parameter is within an image capture capability range of the electronic device, wherein the second image capture parameter comprises one or both of a software image capture parameter or a hardware image capture parameter.

14. The electronic device according to claim 13, wherein after the receiving by the electronic device, the second operation, the one or more processors further execute the instructions to perform the following:

displaying the fourth image on the interface; and before the receiving the first image sent by the second device, the one or more processors further execute the instructions to perform the following:

receiving a third operation, wherein the third operation is for triggering the electronic device to obtain the first image.

15. The electronic device according to claim 13, wherein the software image capture parameter comprises one or more of: a digital zoom value, a size for image cropping, a color temperature calibration mode of an image, whether to perform image denoising, a beauty or body shaping type, a filter type, a sticker option, or whether to enable selfie mirroring;

wherein the hardware image capture parameter comprises one or more of: a quantity of cameras, a camera type, an optical zoom value, whether to enable optical image stabilization, an aperture size, whether to turn on a flash, whether to turn on a fill light, a shutter time, an ISO photosensitive value, a pixel, or a video frame rate.

16. The electronic device according to claim 13, wherein the second image capture parameter comprises a combination image capture parameter, the combination image capture parameter comprising one or more of: a hybrid zoom range, a night mode, a portrait mode, a time-lapse mode, a slow motion (slo-mo) mode, a panoramic mode, or a high dynamic range (HDR).

17. An image capture method applied to a first device, the method comprising:

receiving, by the first device, a second operation;

receiving, by the first device in response to the second operation when a communication connection has been established between the first device and a second device, a first image sent by the second device, the first image being obtained by the second device based on a preset first image capture parameter;

displaying, by the first device, the first image on an interface of an application, and skipping displaying a fourth image before the communication connection has been established between the first device and the second device, the second operation is for the first device to display the fourth image, and the fourth image is obtained by the first device;

displaying, by the first device, the third image on the interface in response to the first operation, and stopping displaying the first image;

receiving, by the first device, a first operation performed on the interface;

receiving, by the first device, a second image sent by the second device; and displaying, by the first device, a third image on the interface in response to the first operation, wherein the third image is obtained by the electronic device by processing the second image based on a second image capture parameter indicated by the first operation, or the third image is the second image obtained by the second device based on the second image capture parameter indicated by the first operation, and the second image capture parameter is within an image capture capability range of the electronic device, wherein the second image capture parameter comprises one or both of a software image capture parameter or a hardware image capture parameter.

18. The method according to claim 17, wherein after the receiving, by the first device, the second operation, the method further comprises:

displaying, by the first device, the fourth image on the interface; and before the receiving, by the first device, the first image sent by the second device, the method further comprises:

receiving, by the first device, a third operation, wherein the third operation is for triggering the first device to obtain the first image.

19. The method according to claim 17, wherein after the receiving, by the first device, the second operation, the method further comprises:

sending, by the first device, a first request to the second device, wherein the first request is for triggering the second device to obtain the first image.

* * * * *